United States Patent
Koizumi et al.

(10) Patent No.: US 7,651,158 B2
(45) Date of Patent: Jan. 26, 2010

(54) VEHICLE BODY STRUCTURE

(75) Inventors: Iwao Koizumi, Fuchu-cho (JP); Kenji Nonaka, Fuchu-cho (JP); Kouji Kishino, Fuchu-cho (JP); Masayoshi Sannomiya, Fuchu-cho (JP); Tsuneaki Zenitani, Fuchu-cho (JP)

(73) Assignee: Mazda Motor Corporation (JP)

( * ) Notice: Subject to any disclaimer, the term of this patent is extended or adjusted under 35 U.S.C. 154(b) by 430 days.

(21) Appl. No.: 11/797,770

(22) Filed: May 7, 2007

(65) Prior Publication Data
US 2007/0262615 A1 Nov. 15, 2007

(30) Foreign Application Priority Data

| | | |
|---|---|---|
| May 10, 2006 | (JP) | 2006-131025 |
| May 17, 2006 | (JP) | 2006-137577 |
| May 18, 2006 | (JP) | 2006-138964 |
| May 18, 2006 | (JP) | 2006-138965 |
| May 18, 2006 | (JP) | 2006-138966 |

(51) Int. Cl.
*B62D 25/02* (2006.01)
*B62D 25/08* (2006.01)

(52) U.S. Cl. ............... 296/203.02; 296/203.03; 296/198; 296/146.15; 296/191; 362/507

(58) Field of Classification Search ............ 296/146.15, 296/191, 198, 203.01, 203.02, 203.03; 362/506, 362/507
See application file for complete search history.

(56) References Cited

U.S. PATENT DOCUMENTS

| | | | | |
|---|---|---|---|---|
| 5,746,474 | A  * | 5/1998 | Bacina et al. | 296/191 |
| 6,409,368 | B1 * | 6/2002 | Henneboehle et al. | 362/517 |
| 6,951,365 | B2 * | 10/2005 | Chase et al. | 296/187.03 |
| 7,083,224 | B2 * | 8/2006 | Yamamura et al. | 296/198 |
| 2005/0077755 | A1 | 4/2005 | Yasui | |

FOREIGN PATENT DOCUMENTS

| | | |
|---|---|---|
| EP | 1 481 878 | 12/2004 |
| JP | 2000-103360 | 4/2000 |

OTHER PUBLICATIONS

European search report application EP 07 10 7606 dated Jul. 12, 2007.

* cited by examiner

*Primary Examiner*—Dennis H Pedder
(74) *Attorney, Agent, or Firm*—Studebaker & Brackett PC; Donald R. Studebaker

(57) ABSTRACT

Disclosed is a vehicle body structure which has a sub-window plate and a front fender each disposed at the rear of a headlamp lens on a sidewall of a vehicle body. In the vehicle body structure, a longitudinally-extending concave portion 60 is defined between the front fender 4 and a combination of a front pillar 52 and a hood 2. The concave portion 60 has at least a frontward region partly receiving therein a headlamp lens 10 and a rearward region receiving therein the sub-window plate 30 at the rear of the headlamp lens 10, whereby a plurality of components including at least the headlamp lens 10 and the sub-window plate 30 are received in the concave portion 60 to form a belt-line surface module F which continuously covers the concave portion 60 to define a transparent or semi-transparent exterior surface on the sidewall of the vehicle body. The vehicle body structure of the present invention makes it possible to further effectively utilize a sidewall surface of the vehicle body so as to desirably enhance a function of the sidewall surface as a whole.

10 Claims, 20 Drawing Sheets

VEHICLE BODY STRUCTURE

BACKGROUND OF THE INVENTION

1. Field of the Invention

The present invention relates to a vehicle body structure, and more particularly to a vehicle body structure having a front fender and a sub-window plate, such as a front quarter window glass, on a sidewall of a front portion of a vehicle body.

2. Description of the Related Art

Heretofore, in vehicles, such as minivans, there has been known a technique of providing a sub-window, such as a front quarter window, below a front pillar so as to improve lateral visibility for a front-seat passenger, particularly a driver.

For example, JP 2000-103360A (hereinafter referred to as "Patent Publication 1") discloses a vehicle body structure having a front pillar panel formed with a triangular opening to provide a front quarter window below a front pillar and thereby improve lateral visibility for a front-seat passenger.

The Patent Publication 1 further discloses a structure of a sidewall of the vehicle body around the triangular opening, which comprises a plurality of body members including a wheel apron reinforcement member.

In vehicles, a headlamp is commonly provided at a front end of a vehicle body to illuminate a road surface ahead thereof, and recently subjected to demands for improving illumination performance and contributing to aesthetic exterior appearance of a vehicle. With a view to meeting such demands, some vehicles are designed such that a headlamp unit is arranged to allow a headlamp lens thereof to extend from a front end surface to a side surface across a front end corner of a vehicle body.

If this headlamp arrangement is simply applied to the above vehicle having the sub-window, a front fender will be located at the rear of the headlamp lens extending to a front end region of the side surface of the vehicle body, and a sub-window plate of the aforementioned sub-window will be located at the rear of the front fender.

This means that the front fender which merely serves as means to define an exterior surface of a sidewall of a vehicle body is interposed between the headlamp lens and the sub-window plate each serving as a functional component. Thus, it has been sought how to further effectively utilize the zone occupied by the front fender. That is, if some kind of advantageous function can be given to the zone occupied by the front fender located at the rear of the headlamp lens, the sidewall surface of the vehicle body will be able to be further effectively utilized. Therefore, there is the need for providing a vehicle body structure capable of achieving such desirable functionality.

SUMMARY OF THE INVENTION

In view of the above circumstance, with a focus on a vehicle body structure having a front fender and a sub-window plate each disposed at the rear of a headlamp lens on a sidewall of a vehicle body, it is an object of the present invention to further effectively utilize a sidewall surface of the vehicle body so as to desirably enhance a function of the sidewall surface as a whole.

In order to achieve this object, the present invention provides a vehicle body structure which comprises a frame-shaped window mounting member disposed above a door hinge pillar to serve as a mounting seat for a sub-window plate, a front pillar disposed above the window mounting member to extend frontwardly and obliquely downwardly along a lateral edge of a front windshield, an engine-compartment hood (2) disposed in front of a location of the front windshield, and a front fender disposed below the window mounting member to define a part of an exterior surface of a sidewall of a vehicle body. The vehicle body structure is characterized in that the front fender has an upper edge which extends in a longitudinal direction of the vehicle body at a height position spaced apart downwardly by a predetermined distance from a lower edge of a lateral end of the engine-compartment hood and a lower edge of the front pillar, so that a longitudinally-extending concave portion is defined between the upper edge of the front fender and the respective edges of the engine-compartment hood and the front pillar. The concave portion has at least a frontward region partly receiving therein a headlamp lens and a rearward region receiving therein the sub-window plate at the rear of the headlamp lens, whereby a plurality of components including at least the headlamp lens and the sub-window plate are received in the concave portion to form a belt-line surface module which continuously covers the concave portion to define a transparent or semi-transparent exterior surface on the sidewall of the vehicle body.

In the above vehicle body structure of the present invention, the sub-window plate is disposed at the rear of the headlamp lens on the sidewall of the vehicle body to form the belt-line surface module which continuously extends in the longitudinal direction of the vehicle body to define a transparent or semi-transparent exterior surface on the sidewall of the vehicle body. Thus, the exterior surface of the sidewall of the vehicle body can be further effectively utilized to desirably enhance a function of the sidewall surface as a whole.

DESCRIPTION OF THE PREFERRED EMBODIMENTS

The present invention will now be specifically described based on various embodiments thereof with reference to the drawings. A vehicle body structure according to each of the embodiment is fundamentally designed to be bilaterally symmetric. Therefore, the following description will be made primarily about only one side of a vehicle body.

With reference to FIGS. 1 to 11, a first embodiment of the present invention will be described below.

Figure 1:
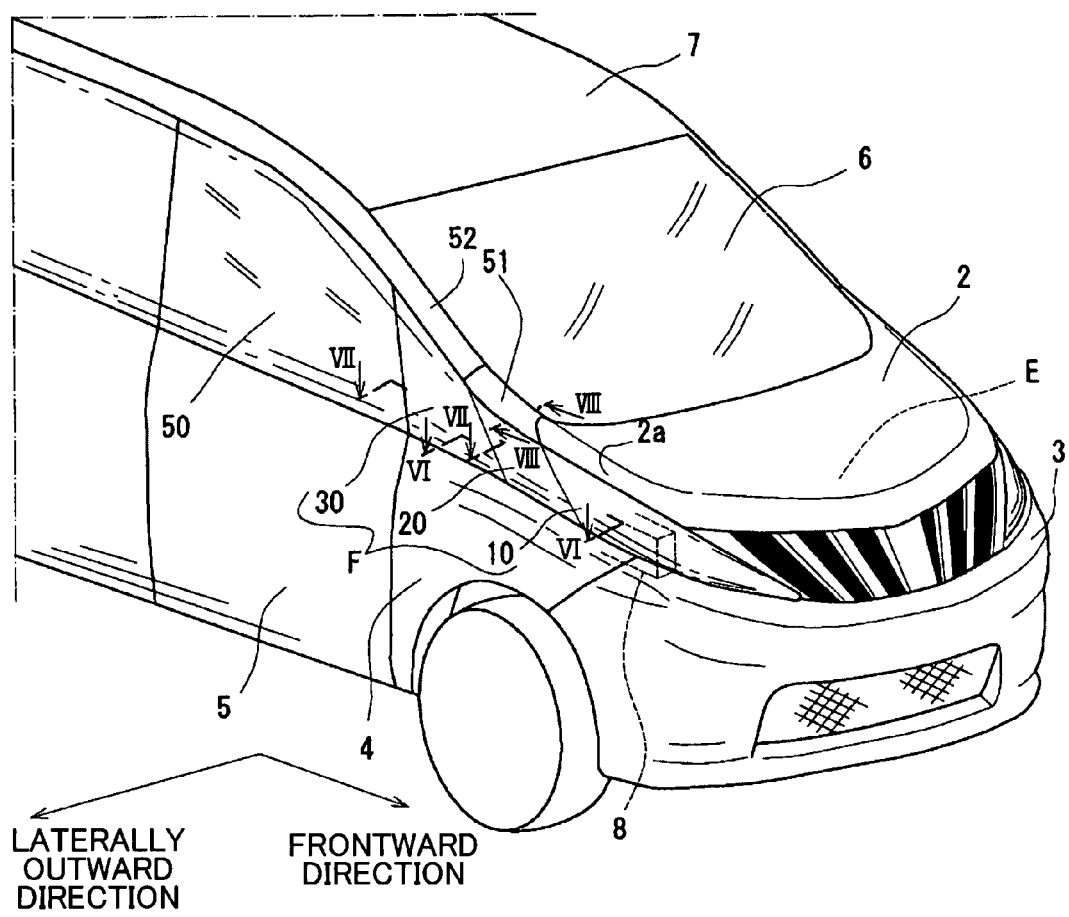
FIG. 1 is a general perspective view showing a sidewall of a vehicle body which employs a vehicle body structure according to a first embodiment of the present invention.

As shown in FIG. 1, a vehicle in this embodiment is a so-called minivan type designed such that an engine compartment E is formed in a front portion of a body thereof to have a relatively small length in a frontward/rearward, i.e., longitudinal, direction of the vehicle body.

This vehicle body structure comprises: an engine-compartment hood (hereinafter referred to simply as "hood") 2 adapted to openably cover an upper opening of the engine compartment E; a front bumper 3 disposed at a front end of the engine compartment E to define a part of a front end surface of the vehicle body; a front fender 4 disposed on a lateral side of the engine compartment E to define a part of an exterior surface of a sidewall of the vehicle body (hereinafter referred to as "body sidewall"); a side door 5 disposed to be continuous with a rear end of the front fender 4; a front windshield 6 disposed at the rear of the hood 2 to extend rearwardly and obliquely upwardly (i.e., frontwardly and obliquely downwardly); and an approximately horizontal roof panel 7 disposed at the rear of the front windshield 6. The vehicle body structure further includes a wheel apron reinforcement member 8 disposed below a lateral end 2a of the hood 2 to extend longitudinally along an inner surface of an upper edge region of the front fender 4 so as to form an upper region of a sidewall of the engine compartment E (see FIG. 5).

A lens 10 of a headlamp unit (hereinafter referred to as "headlamp lens 10"), a garnish 20 made of a clear polymeric material and a sub-window plate 30 are arranged in this order from the front end of the vehicle body in the rearward direction to define an upper region of an exterior surface of the body sidewall.

Each of the headlamp lens 10, the garnish 20 and the sub-window plate 30 has a transparent or semi-transparent outer surface. The headlamp lens 10, the garnish 20 and the sub-window plate 30 are aligned with each other along a so-called "belt line" which is set around a horizontal center line of a longitudinal vertical plane of the vehicle body, specifically corresponds to an upper edge of a panel of the side door 5, so that a belt-line surface module F is formed to provide a transparent or semi-transparent exterior surface having a high reflectance onto the body sidewall.

Figure 2:
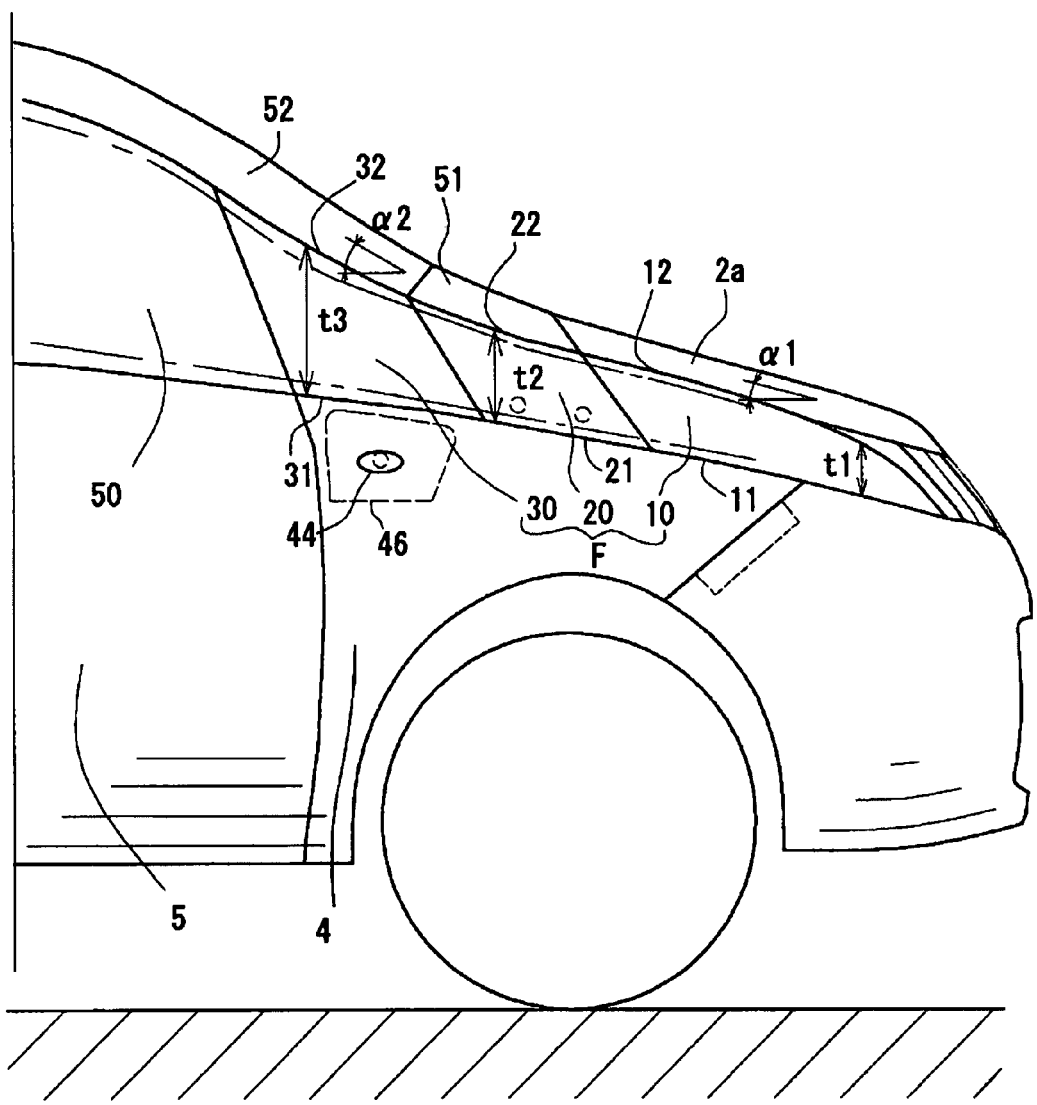
FIG. 2 is a side view of the sidewall.

As shown in FIG. 2, the belt-line surface module F extends linearly and rearwardly from the front end of the vehicle body. A width t1 of a front end region of the headlamp lens 10, a width t2 of the garnish 20 and a width t3 of the sub-window plate 30 are set to satisfy the following relation: t1<t2<t3. That is, the belt-line surface module F is formed to have a width which gradually increases in the rearward direction.

These components 10, 20, 30 are formed and arranged such that respective lower edges thereof are aligned with each other in a linear line, and respective upper edges thereof are aligned with each other in a smoothly curved line. This allows the belt-line surface module F to be visually recognized as an integral or coherent unit from the outside.

In this embodiment, a side door window glass 50 assembled to the sashless-type side door 5 is disposed at the rear of the belt-line surface module F. Specifically, the side door window glass 50 in its closed state is disposed in adjacent relation to the sub-window plate 30 defining a rear edge of the belt-line surface module F, to provide a broader range of transparent or semitransparent exterior surface region including the side door window glass 50.

The lateral end 2a of the hood 2, an upper fender 51 and the front pillar 52 which serve as auxiliary elements for defining the exterior surface of the body sidewall are arranged above the belt-line surface module F in this order in the rearward direction, and each of these members is formed in a curved shape to approximately conform to the upper edge of the belt-line surface module F in side view.

As shown in FIG. 2, the front pillar 52 is disposed to extend frontwardly and obliquely downwardly with an inclination angle α2, and designed to support one of opposite lateral ends of the front windshield 6 (see FIG. 1). The lateral end 2a of the hood 2 is disposed to extend in the longitudinal direction with an inclination angle α1 less than the inclination angle α2 of the front pillar 52.

The upper fender 51 is disposed between a front edge of the front pillar 52 and a rear edge of the lateral end 2a of the hood 2 to smoothly connect the two members together. Specifically, as shown in FIG. 2, the upper fender 51 is formed in a downwardly concave arc shape to smoothly connect the front pillar 52 extending with the relatively large inclination angle α2, to the lateral end 2a of the hood 2 extending with the relatively small inclination angle α1. This makes it possible to allow the front pillar 52 and the hood 2 to be visually recognized such that they are smoothly connected together.

The structure of the belt-line surface module F will be more specifically described below.

Figure 3:
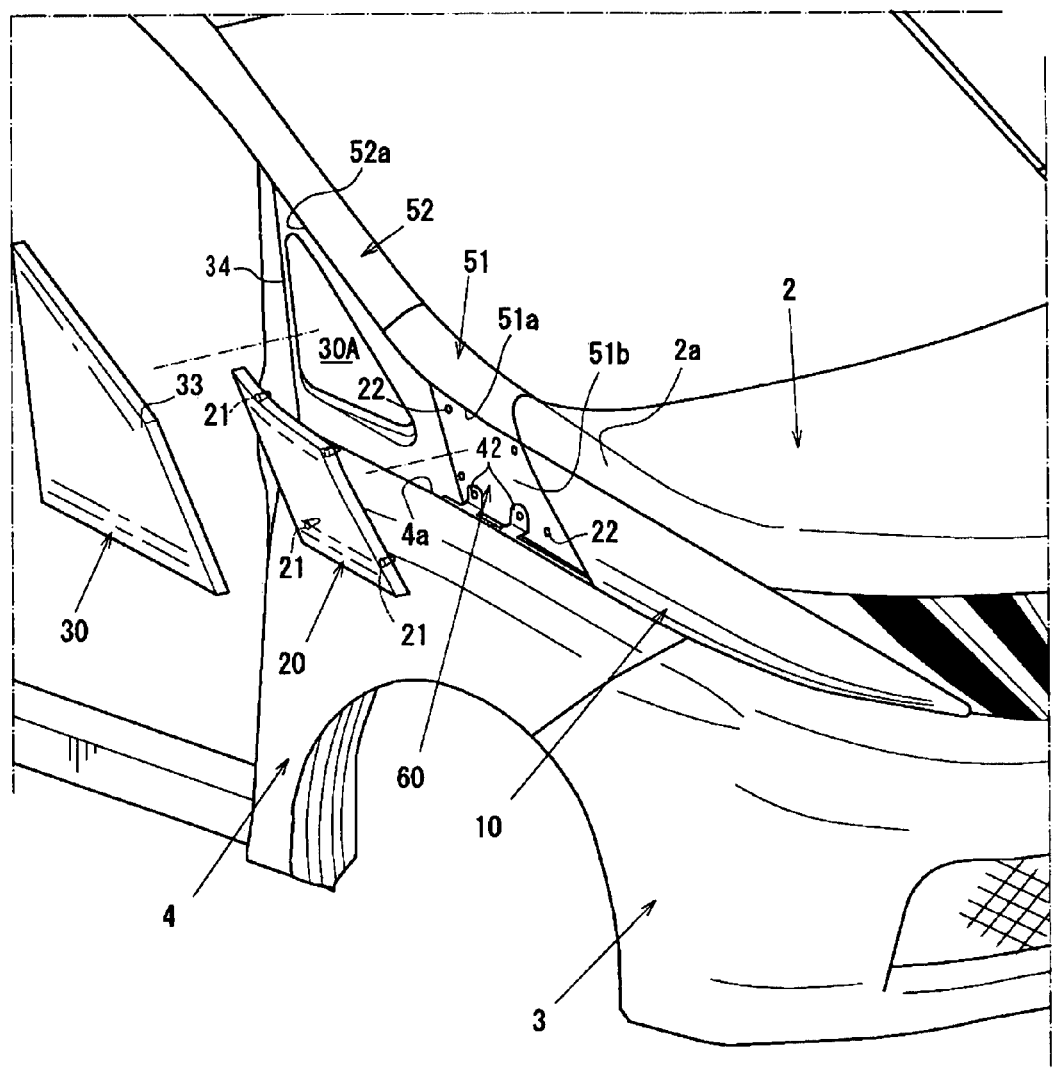
FIG. 3 is an exploded perspective view showing the sidewall in a state after a sub-window plate and other component are detached therefrom.

As shown in FIG. 3, the belt-line surface module F comprises a part (rear end) of the headlamp lens 10, the garnish 20 and the sub-window plate 30 each received in a concave portion 60 formed in the body sidewall (in FIG. 3, the garnish 20 and sub-window plate 30 are disassembled therefrom.)

Specifically, a region vertically sandwiched between an upper edge 4a of the front fender 4 and a combination of a lower edge of the lateral end 2a of the hood 2, a lower edge 51a of the upper fender 51 and a lower edge of the front pillar 52, is concaved inwardly in a width, i.e., lateral direction (laterally inward direction) of the vehicle body by a predetermined distance. Then, the headlamp lens 10, the garnish 20 and the sub-window plate 30 are received in the concaved portion 60 in this order in the rearward direction to form the longitudinally-extending belt-line surface module F.

A rear end of the headlamp lens 10 (with a rear end of a headlamp housing) is attached to a front end region of the concave portion 60 having a width (i.e., height dimension) which gradually decreases in the frontward direction, by suitable fastening means, such as bolting.

The garnish 20 has a laterally inwardly-facing (i.e., inner) surface provided with a plurality (in this embodiment, four) of clip legs 21, 21, - - - . In an operation of attaching the garnish 20, the garnish 20 is pressed in the laterally inward direction to allow each of the clip legs to be engaged with a corresponding one of a plurality of engagement holes 22, 22, - - - , formed in a base 51b of the upper fender 51, and thereby attached to a longitudinally intermediate region of the concave portion 60.

The garnish 20 fixed to the body sidewall (specifically, a mounting sidewall segment as described in detail later) through the detachable clip legs 21 in the above manner can be detached therefrom according to need. Thus, in an operation of repairing the front fender 4, the garnish 20 can be readily detached to facilitate subsequent operations, such as detachment of the front fender 4, as described in detail later.

In an operation of attaching the sub-window plate 30, the sub-window plate 30 is adhesively bonded to a laterally outward-facing (i.e., outer) surface of a window mounting member 34 disposed below the front pillar 52, and thereby attached to a rear end region of the concave portion 60. The window mounting member 34 is formed with one approximately triangular-shaped opening 30A to ensure lateral visibility through the sub-window plate 30.

The sub-window plate 30 adhesively bonded to the window mounting member 34 can effectively prevent foreign matters, such as rain water, from getting into a passenger compartment via the opening 30A.

As shown in FIG. 3, the sub-window plate 30 to be bonded to the window mounting member 34 is formed of a glass body having an approximately trapezoid shape in side view to provide a larger glass surface area than that of a commonly-used triangular-shaped sub-window glass.

In addition, the lower edge 51a of the upper fender 51 is formed in the downwardly concave shape as mentioned above. Thus, for example, as compared with a case of forming the lower edge 51a to extend linearly with the same inclination angle α2 as that of the front pillar 52, a front corner 33 of an upper edge of the sub-window plate 30 can be set at a higher position (i.e., a vertical length (height dimension) of a front edge of the sub-window plate 30 can be increased.) This provides an advantage of being able to effectively increase a lateral visual range through the sub-window plate 30.

Figure 4:
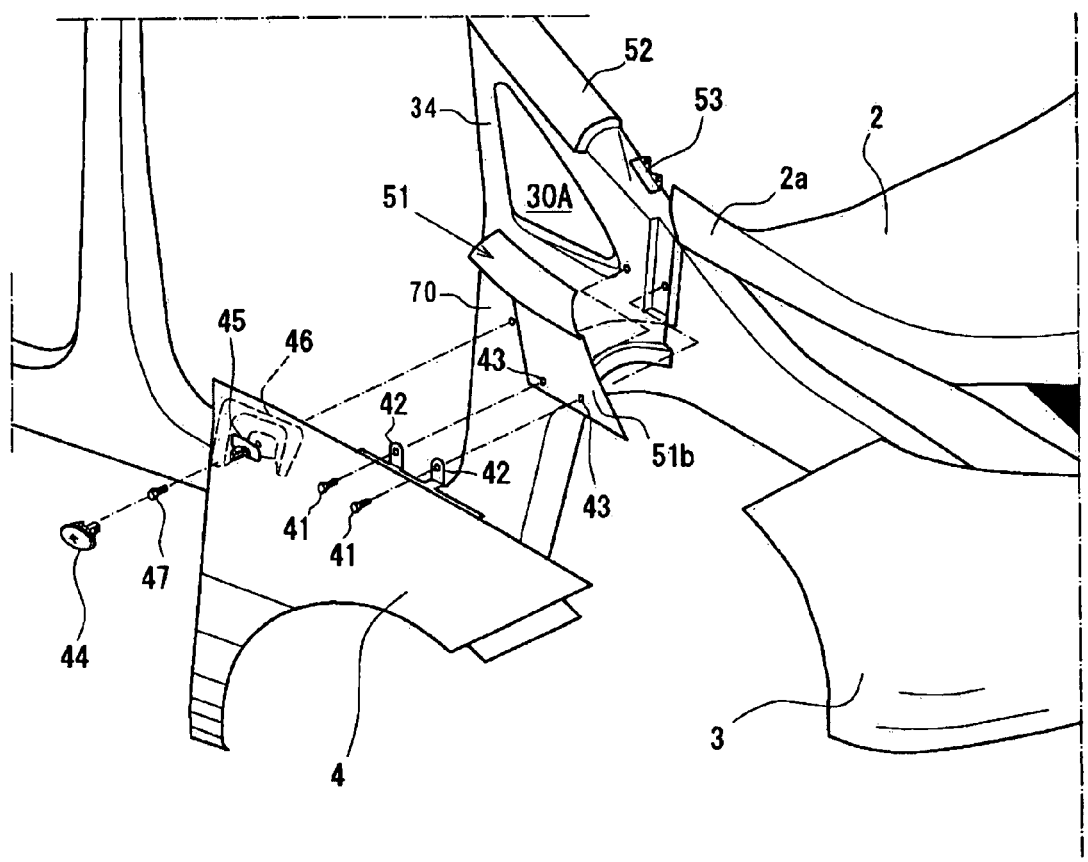
FIG. 4 is an exploded perspective view showing the sidewall in a state after a front fender and other component are detached therefrom.

As shown in FIG. 4, a door hinge pillar 70 is disposed below the window mounting member 34 mounting the sub-window plate 30 thereonto, and a front end of the side door 5 is pivotally attached to the hinge pillar 70 through a hinge member (not shown) or the like.

As shown in FIG. 4, each of the front fender 4 and the upper fender 51 is designed to be detached from the mounting sidewall segment according to needed.

Specifically, the front fender 4 has two fastening flanges 42, 42 formed at an upper edge thereof to protrude upwardly, and the base 51b of the upper fender 51 is formed with two bolt-insertion holes 43, 43 at positions corresponding to the respective fastening flanges 42, 42. In a fastening operation, after aligning respective peripheral edges of the bolt-insertion holes 43, 43 with the corresponding fastening flanges 42, 42, each of two fastening bolt 41, 41 is inserted into each pair of the aligned bolt-insertion holes 43 and fastening flanges 42, 42, and driven into the mounting sidewall segment to fix the front fender 4 and the upper fender 51 to the mounting sidewall segment together.

In an operation of detaching the front fender 4 and the upper fender 51 from the mounting sidewall segment, the garnish 20 fixed by the clip legs is detached using a tool or the like to expose the fastening flanges 42, 42 at the upper edge of the front fender 4, and then the fastening bolts 41, 41 fastening the fastening flanges are detached using a tool or the like (see FIG. 4). Through this operation, the front fender 4 and the upper fender 51 can be detached from the mounting sidewall segment.

The front fender 4 has a rear region formed with an opening 45 for allowing a winker lamp (i.e., direction indicator) to be insertingly attached thereto. Further, a gusset 46 for fastening the front fender 4 to the door hinge pillar 70 is fixed onto an inner surface of the front fender 4 at a periphery of the opening 45.

In a similar manner, the front fender 4 has front and lower regions provided with a plurality of fastening means for allowing the front fender 4 to be detachably fixed to the mounting sidewall segment. Each of the fastening means may have any suitable conventional mechanism, and its detailed description will be omitted.

The upper fender 51 is detachably fixed to the mounting sidewall segment by fastening an upper portion thereof to an after-mentioned mounting bracket 53 fixed to the front pillar 52.

Figure 5:
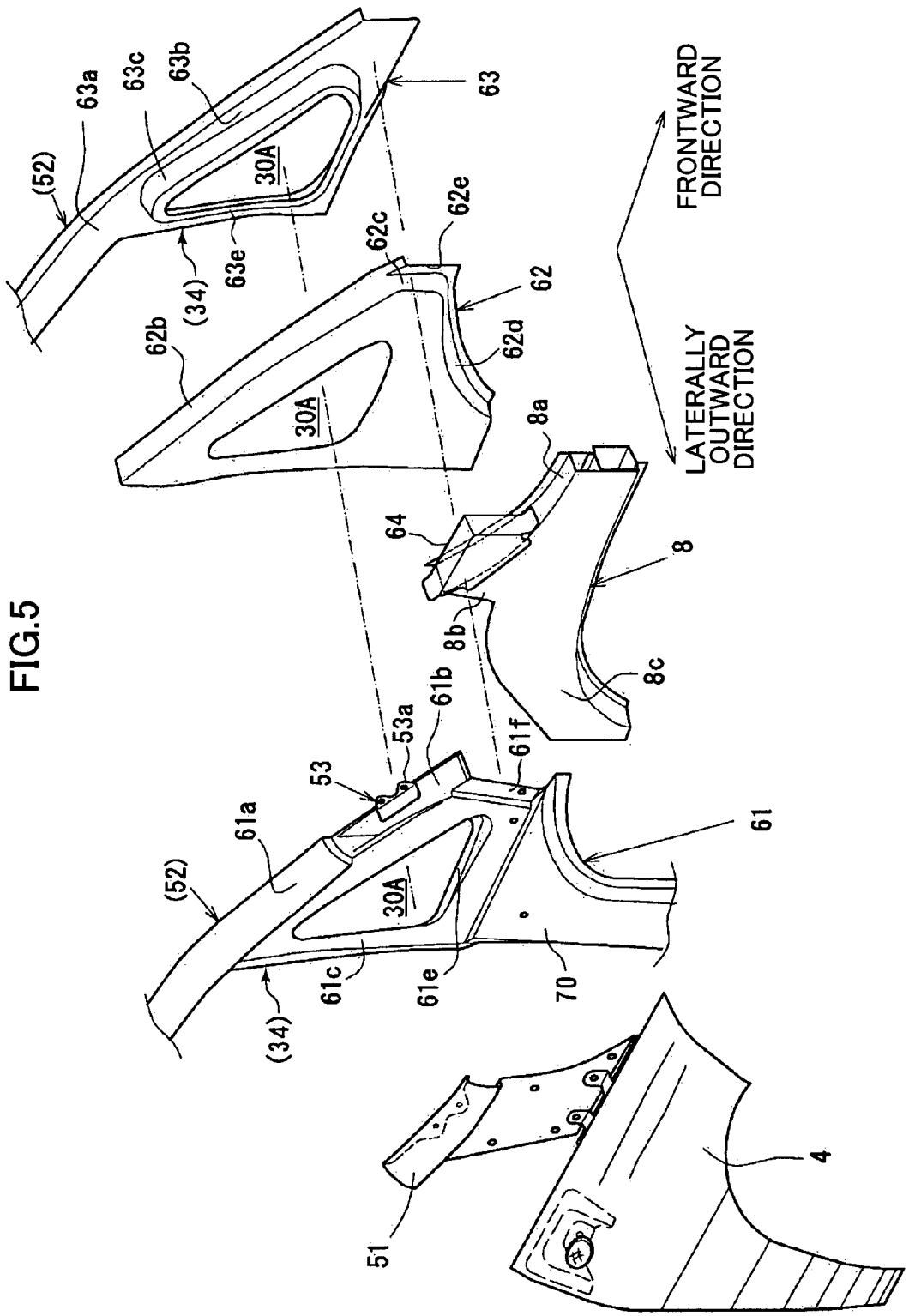
FIG. 5 is an exploded perspective view of the front fender, a window mounting member and other body members for the sidewall.

As shown in FIG. 5, the mounting sidewall segment including the front pillar 52 and the window mounting member 34 is formed by pre-assembling a plurality of members together. Specifically, the mounting sidewall segment comprises: a pillar outer panel 61 located on a laterally outward side of the body sidewall to define an outer surface of the front pillar 52 and other body member; a pillar inner panel 63 located on a laterally inward side of the body sidewall to define an inner surface of the front pillar 52 and other body member; a pillar reinforcement 62 located between the pillar outer panel 61 and the pillar inner panel 63 to reinforce them; and the wheel apron reinforcement member 8 extending in the longitudinal direction to form the upper region of the sidewall of the engine compartment E. These members are pre-assembled together to form the mounting sidewall segment.

The pillar outer panel 61 has an upper end which includes a pillar element portion 61a defining an outer surface of the front pillar 52. The upper end of the pillar outer panel 61 further includes a drawn portion 61b located in front of the pillar element portion 61a, and depressed relative to the pillar element portion 61a in a stepped manner. The drawn portion 61a has a mounting bracket 53 which is joined onto a central region of an upper surface thereof to allow the upper fender 51 to be fastened thereto. The mounting bracket 53 has a fastening portion 53a protruding upward from a base joined to the drawn portion. The fastening portion 53a is formed with two front and rear bolt-insertion holes.

The pillar outer panel 61 further has a frame-shaped portion 61c which is located below the pillar element portion 61a, and formed with an opening 30A. This frame-shaped portion 61c defines an outer surface of the window mounting member 34 to serve as a mounting seat for the sub-window plate 30.

In the frame-shaped portion 61c, a joint flange 61e is formed along a lower peripheral edge of the opening 30A, and bent to protrude toward the passenger compartment, i.e., laterally inwardly, so as to serve as a joint to the pillar inner panel. The frame-shaped portion 61c further is provided with a joint flange 61f which serves as a joint to the wheel apron reinforcement member 8, and extends along a front edge thereof to have a step relative to a body of the frame-shaped portion 61c. This structure of the joint flange 61f can suppress "thermal strain" occurring in the frame-shaped portion 61a serving as the mounting seat for the sub-window plate 30, during welding of the joint flange 61f to the wheel apron reinforcement member 8.

The wheel apron reinforcement member 8 has a longitudinal element portion 8a which extends in the longitudinal direction and has two upper and lower closed sections, and two branch element portions 8b, 8c which are branched at the rear of the longitudinal element portion 8a to extend toward the front pillar 52 (upper side) and the door hinge pillar 70 (lower side), respectively. Based on this structure, the wheel apron reinforcement member 8 has a given level of stiffness enough to serve as a stiffening member of a front end of the window mounting member 34. Further, the upper branch member portion 8b has a hinge bracket 64 fixed onto an upper surface thereof to allow a swing hinge at a rear end of the hood 2 to be fixedly attached thereto.

The pillar reinforcement 62 comprises a frame-shaped panel having one approximately triangular-shaped opening 30A identical to the opening 30A of the pillar outer panel 61. The pillar reinforcement 62 has an upper end 62b, a front end 62c and a lower end 62d each bent in the laterally inward direction. Among these bent ends, the front end 62c and the lower end 62d are formed with a continuous joint flange 62e protruding frontwardly and then downwardly from respective inner edges thereof.

The pillar inner panel 63 has a pillar element portion 63a defining an inner surface of the front pillar 52, and a frame-shaped portion located below the pillar element portion 63a. The frame-shaped portion 63b is formed with an opening 30A, and a rim 63c protruding laterally outwardly to have an distal end formed as a joint flange 63e to be joined to the pillar outer panel 61.

The pillar outer panel 61, the pillar inner panel 63, the pillar reinforcement 62 and the wheel apron reinforcement member 8 are assembled together by welding. Specifically, in an operation of joining these members to each other, the pillar reinforcement 62 and a rear end of the wheel apron reinforcement member 8 are clamped by the pillar outer panel 61 and the pillar inner panel 63 from laterally opposite sides, and then the respective joint flanges of the members are welded to each other using a welding gun (not shown).

Figure 6:
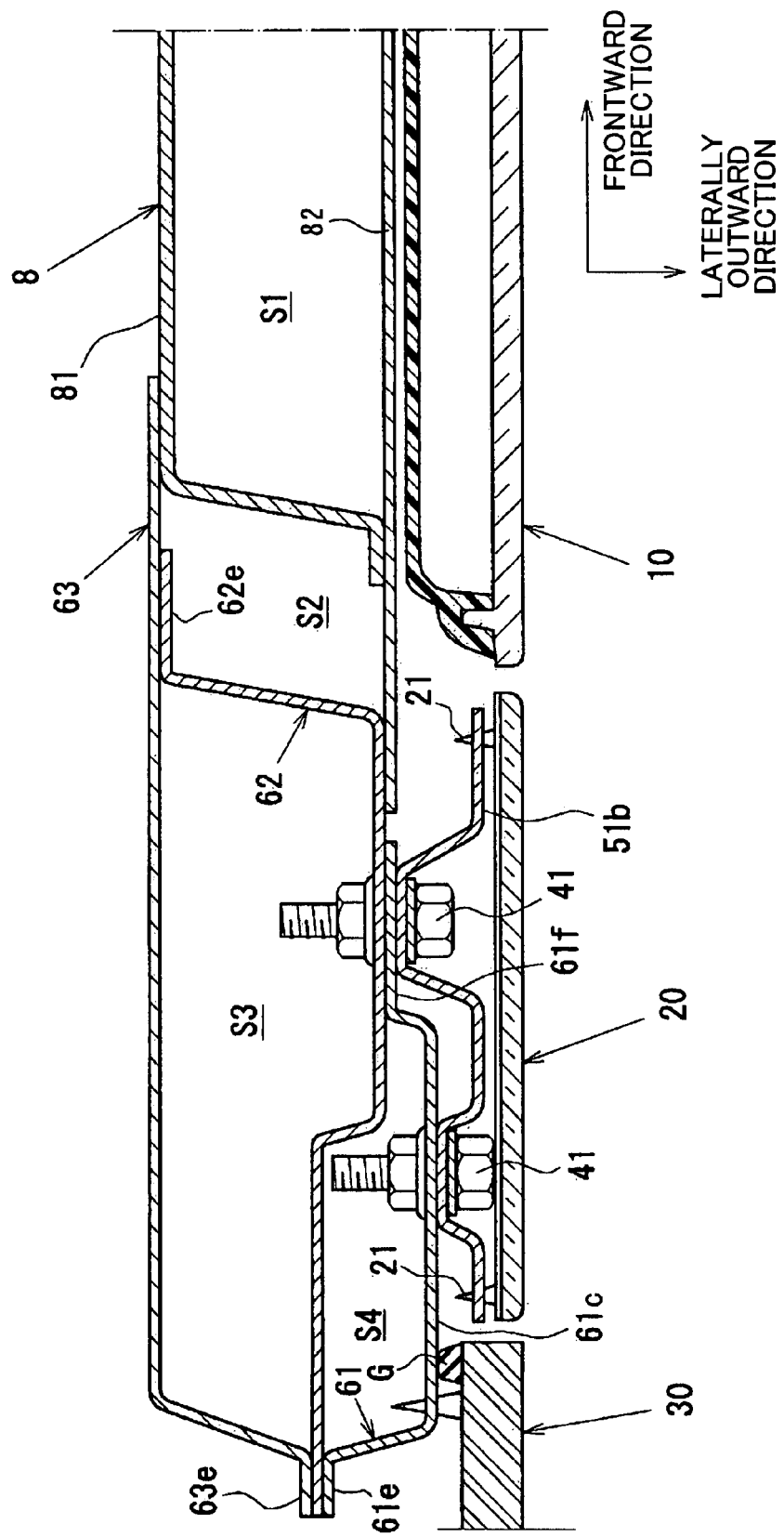
FIG. 6 is a sectional view taken along the line VI-VI in FIG. 1.

As shown in FIG. 6, the wheel apron reinforcement member 8 comprises an outer panel 82 and an inner panel 81, and has a first closed section S1 defined between the outer and inner panel 82, 81. The pillar reinforcement 62 and the pillar inner panel 63 are disposed at the rear of the wheel apron reinforcement member 8 in such a manner that the pillar reinforcement 62 is joined to a rear end of the outer panel 82, and the pillar inner panel 63 is joined to a rear end of the inner panel 81, so as to define a second closed section S2 by cooperation of the wheel apron reinforcement member 8, the pillar inner panel 63 and the pillar reinforcement 62. Further, the joint flange 62e at a front end of the pillar reinforcement 62 is joined to a front region of the pillar inner panel 63, and a rear end of the pillar reinforcement 62 is joined to the joint flange 63e at a rear end of the pillar inner panel 63, so as to define a third closed section S3 between the pillar inner panel 63 and the pillar reinforcement 62. Furthermore, the joint flange 61f at a front end of the pillar outer panel 61 is joined to a central region of the pillar reinforcement 62, and the joint flange 61e at a rear end of the pillar outer panel 61 is joined to a rear end of the pillar reinforcement 62, so as to define a fourth closed section S4 between the pillar reinforcement 62 and the pillar outer panel 61.

In this manner, the above panel members (8, 61, 62, 63) are pre-assembled together so as to form the high-rigidity mounting sidewall segment having the plurality of closed sections to adequately ensure the stiffness for supporting the belt-line surface module F to be attached thereto.

In this embodiment, the headlamp lens 10, the garnish 20 and the sub-window plate 30 are attached to the mounting sidewall segment having the sufficiently high stiffness, in such a manner that respective outer surfaces of these components become flush with each other, as shown in FIG. 6.

Specifically, the headlamp lens 10 (with the headlamp housing) is fixedly fastened to one or more members of the mounting sidewall segment, such as the wheel apron reinforcement member 8, by an attaching screw (not shown) or the like. The garnish 20 is fixed to the mounting sidewall segment by engaging the clip legs 21 of the inner surface thereof with the respective engagement holes 22 formed in the base 52b of the upper fender 51, and fastening the base 51b of the upper fender 51 to the pillar outer panel 61 using the fastening bolts 41, 41. The sub-window plate 30 is fixed to the mounting sidewall segment by bonding to the frame-shaped portion 61c of the pillar outer panel 61 through an adhesive G.

Figure 7:
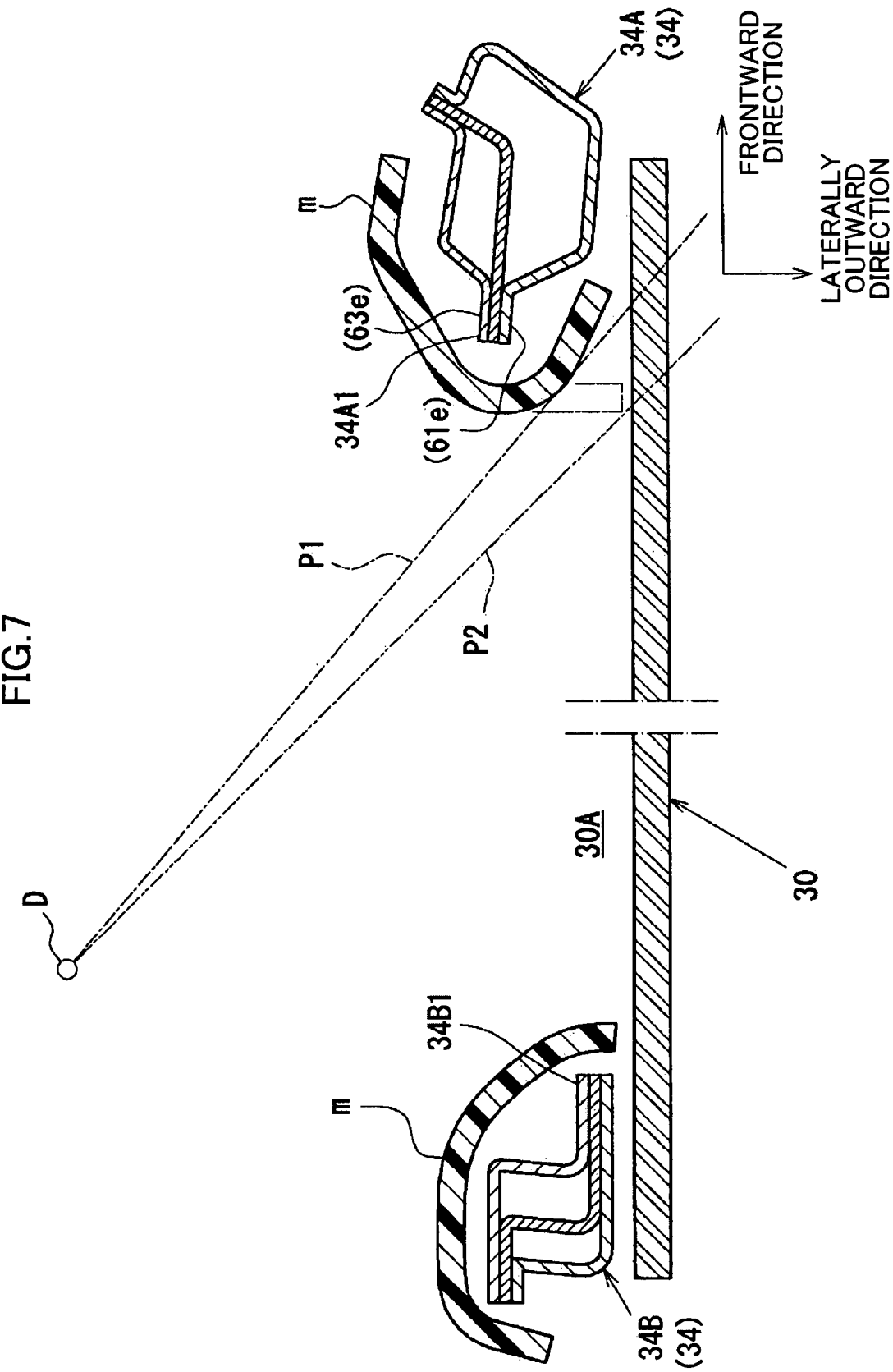
FIG. 7 is a sectional view taken along the line VII-VII in FIG. 1.

In this embodiment, as shown in the sectional view illustrated in FIG. 7, the window mounting member 34 is formed such that a front region 34A and a rear region 34B relative to the opening 30A are different in sectional shape from each other, so as to increase a driver's visual range through the sub-window plate 30.

Specifically, in the window mounting member 34, a joint flange 34A1 of the front region 34A is arranged at a position offset in the laterally inward direction relative to a joint flange 34B1 of the rear region 34B by a predetermined distance. That is, the joint flange 34A1 is arranged more spaced apart from the sub-window plate 30. Thus, as illustrated in FIG. 7, a visual range of a driver D through the sub-window plate 30 is extended in the frontward direction. In FIG. 7, is the one-dot chain line P1 indicates the visible range of the driver D obtained when the joint flange 34A1 is arranged spaced apart from the sub-window plate 30 in the above manner, and the two-dot chain line P2 indicates a visible range of the driver D obtained when the joint flange 34A1 is arranged close to the sub-window plate 30 as with the rear joint flange 34B1. In FIG. 7, "m" indicates a pillar trim covering an inner surface of the window mounting member 34.

Figure 8:
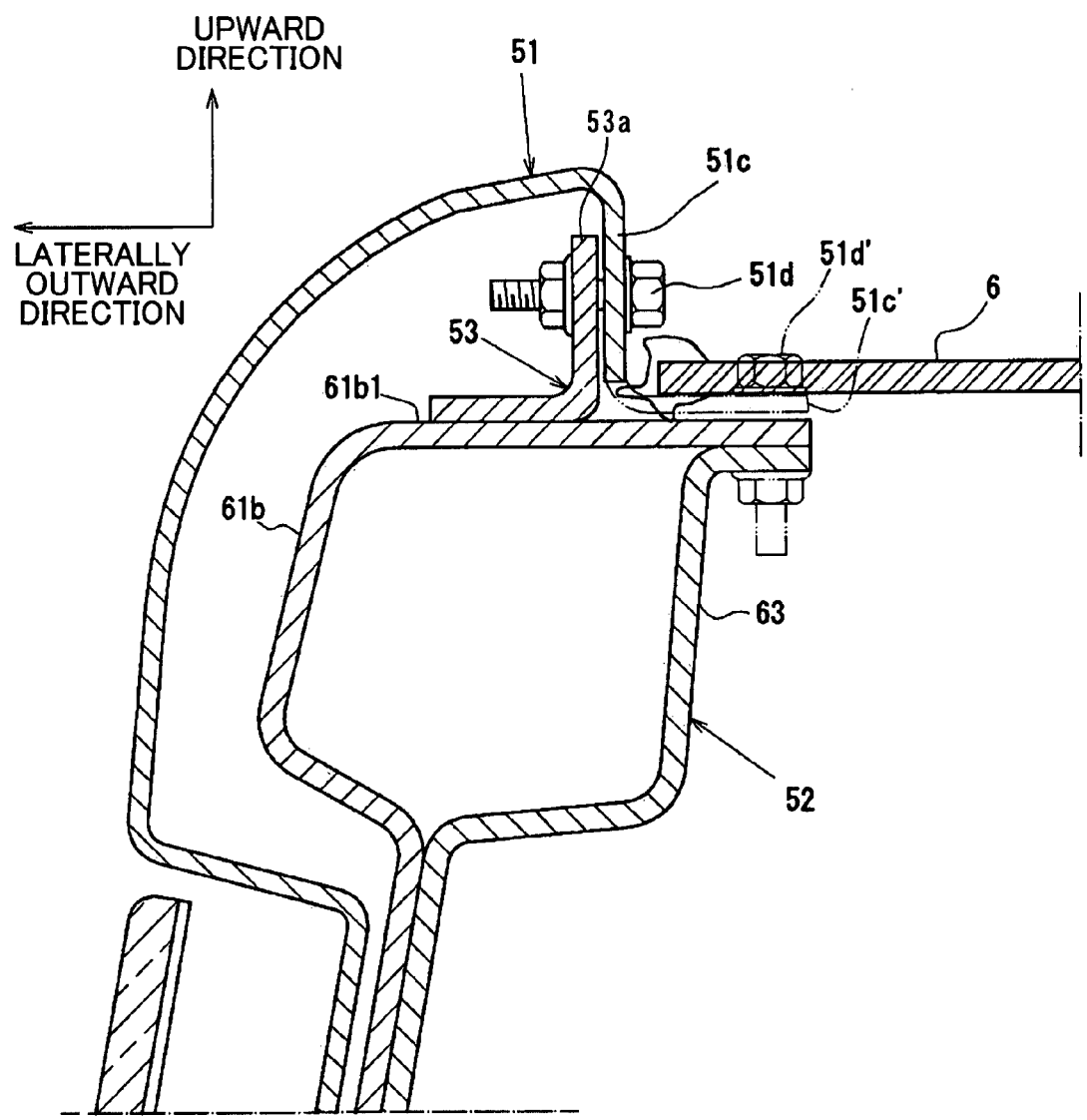
FIG. 8 is a sectional view taken along the line VIII-VIII in FIG. 1.

In this embodiment, as shown in the sectional view illustrated in FIG. 8, a mounting structure of an upper portion of the upper fender 51 is also designed to increase a visual range.

Specifically, the upwardly-protruding mounting bracket 53 is attached to the upper surface 61b1 of the drawn portion 61b of the front pillar 52, as mentioned above. Further, the upper fender 51 has a flange 51c formed to extend downwardly from a top portion thereof along an inner surface of the fastening portion 53a of the mounting bracket 53. The fastening portion 53a and the flange 51c are fastened together by a fastening bolt 51b extending laterally outwardly from the side of the inner surface of the fastening portion 53a, so as to fix the upper portion of the upper fender 51 to the drawn potion 61b. This makes it possible to increase a driver's visual range as compared with conventional structures.

For example, in a conventional structure devoid of the mounting bracket 53, as indicated by two-dot chain line in FIG. 8, the upper fender 51 is typically attached to the drawn portion 61b by forming a lower end of a flange 51c' of the upper fender 51 in such a manner as to extend laterally inwardly along the upper surface 61b1 of the drawn portion 61b, and fastening the extension portion to the pillar outer panel 61 and a joint flange formed at a laterally inward end of the pillar inner panel 63, using a vertically-extending fastening bolt 51'. In this structure, a support position of a lateral end of the front windshield 6 has to be shifted laterally inwardly relative to the fastening bolt 51d', and thereby a surface area of the front windshield is reduced to undesirably restrict driver's frontward visual range.

In contrast, the structure in this embodiment where the mounting bracket 53 is additionally provided to the upper surface 61b1 of the drawn portion 61b of the front pillar 52, and the flange 51c of the upper fender 51 is fastened thereto by the laterally-extending fastening bolt 51b, has an advantage of being able to increase the surface area of the front windshield 6 in the lateral direction so as to effectively increase a frontward visual range through the front windshield 6.

Figure 9:
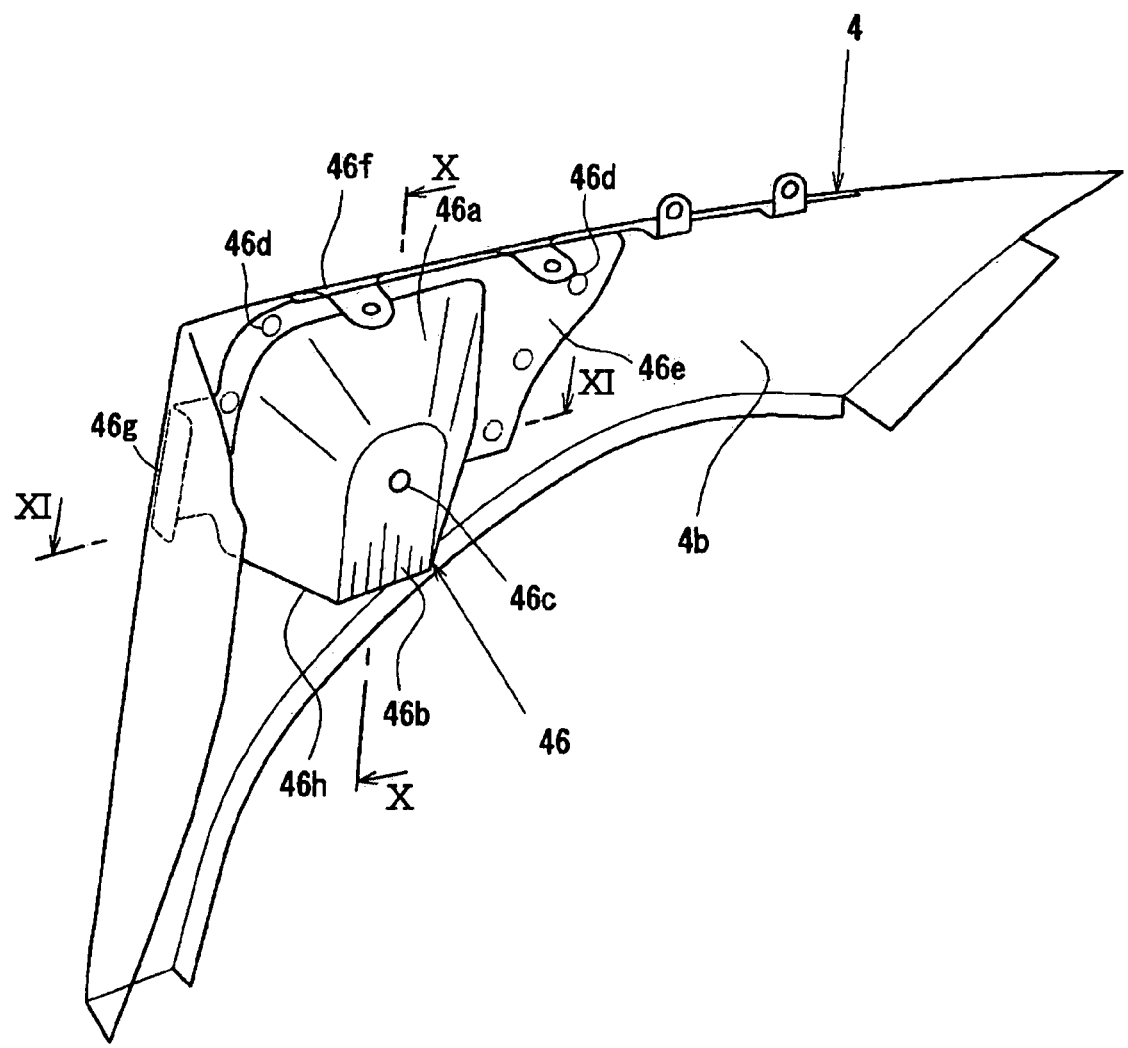
FIG. 9 is a perspective view showing a structure of a laterally inward-facing surface of the front fender.
Figure 10:
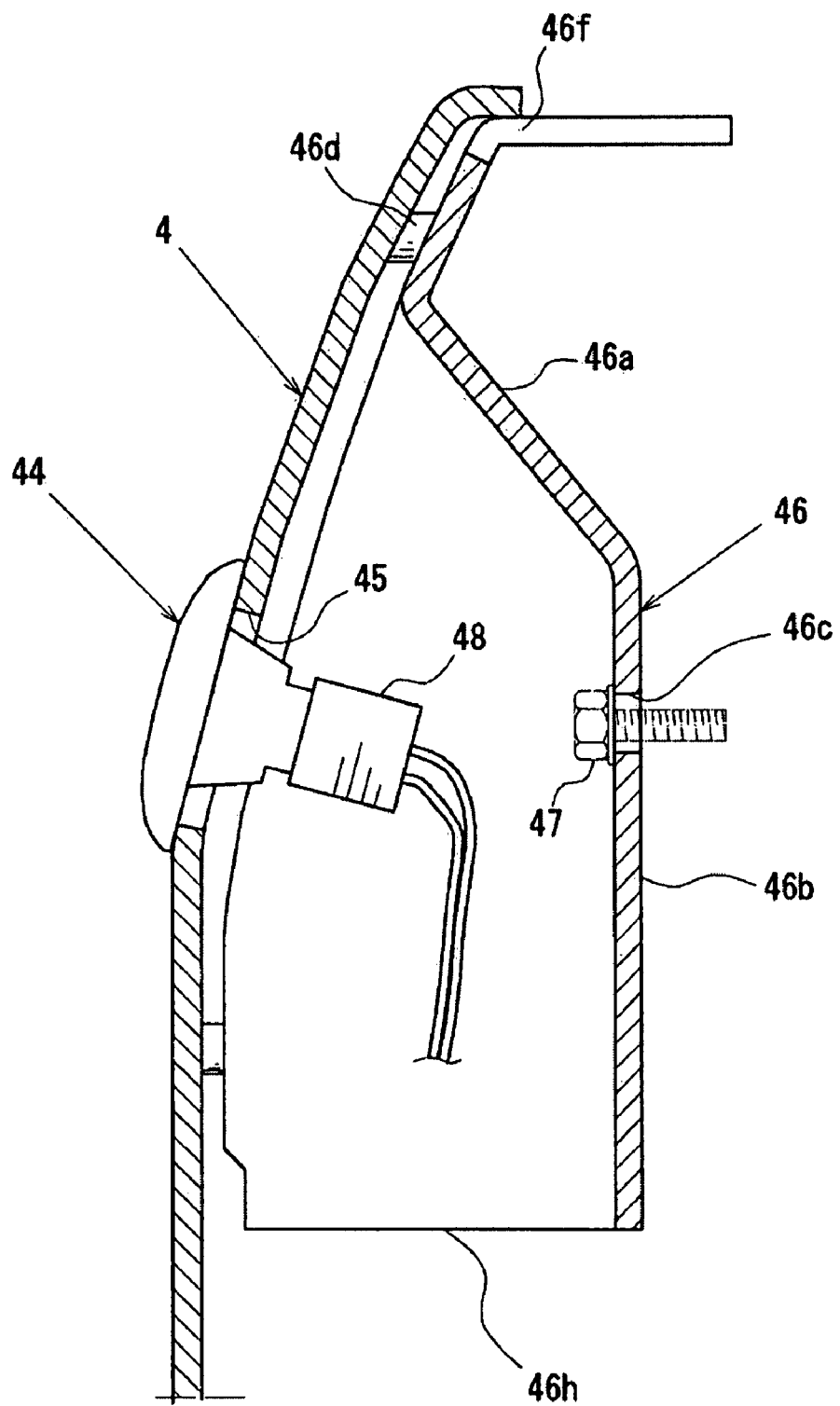
FIG. 10 is a sectional view taken along the line X-X in FIG. 9.

The gusset 46 provided in the front fender 4 will be more specifically described below. As shown in FIG. 9, the front fender 4 is provided with the laterally inwardly-protruding gusset 46, as mentioned above.

The gusset 46 has a raised portion 46a protruding in the laterally inward direction, and a flat portion 46b formed at a distal end of the raised portion 46a. The flat portion 46b is formed with an insertion hole 46c for allowing a fastening bolt 47 (see FIG. 10) to be inserted therethrough. The gusset 46 is designed to be fastened to the door hinge pillar 70 as one member of the mounting sidewall segment, by the fastening bolt 47 to be inserted through the insertion hole 46c (see FIG. 4). The gusset 46 has a contact flange 46 which is provided around the raised portion 46a and formed to come into contact with the inner wall surface 4b of the front fender 4 through an adhesive cushioning material 46d. The contact flange 46e has two joint flanges 46f, 46g which are formed, respectively, at upper and rear ends thereof, and joined to the front fender 4. The gusset 46 has an open bottom 46h (see FIG. 10).

Based on the above structure, the laterally inwardly-protruding gusset 4 is fixed to the front fender 4, and the upper portion of the front fender 4 is fixedly attached to the door hinge pillar 70 through the gusset 4. Thus, the front fender 5 can be firmly attached to the mounting sidewall segment without looseness or wobbling.

More specifically, in the vehicle body structure according to the first embodiment, the sub-window plate 30 is adhesively fixed to the window mounting member 34, as described above, and therefore the window mounting member 34 cannot be used as a location for fastening the upper portion of the front fender 4 to the mounting sidewall segment. In this case, if the above gusset 46 is not provided in the front fender 4, it is difficult to ensure a location for fastening the upper portion of the front fender 4 to the mounting sidewall segment. This is likely to cause deterioration in fastening force of the front fender 4 as a whole, resulting in occurrence of looseness or wobbling between the front fender 4 and the mounting sidewall segment.

In contrast, the structure in this embodiment where the laterally inwardly-protruding gusset 4 provided in the front fender 4 is buttingly fixed to the door hinge pillar 70, has an advantage of being able to increase a fastening force of the upper portion of the front fender 4 so as to effectively prevent the occurrence of looseness or wobbling.

The above gusset 46 is fixed to the front fender 4 at a position where, in side view, the insertion hole 46c of the gusset 46 is aligned with the opening 45 of the front fender 45 for allowing the winker lamp 44 to be insertingly attached thereto. Thus, in an operation of attaching/detaching the front fender 4, the fastening bolt 47 can be readily attached/detached through the opening 45 to facilitate the operation (see FIG. 2).

Figure 11:
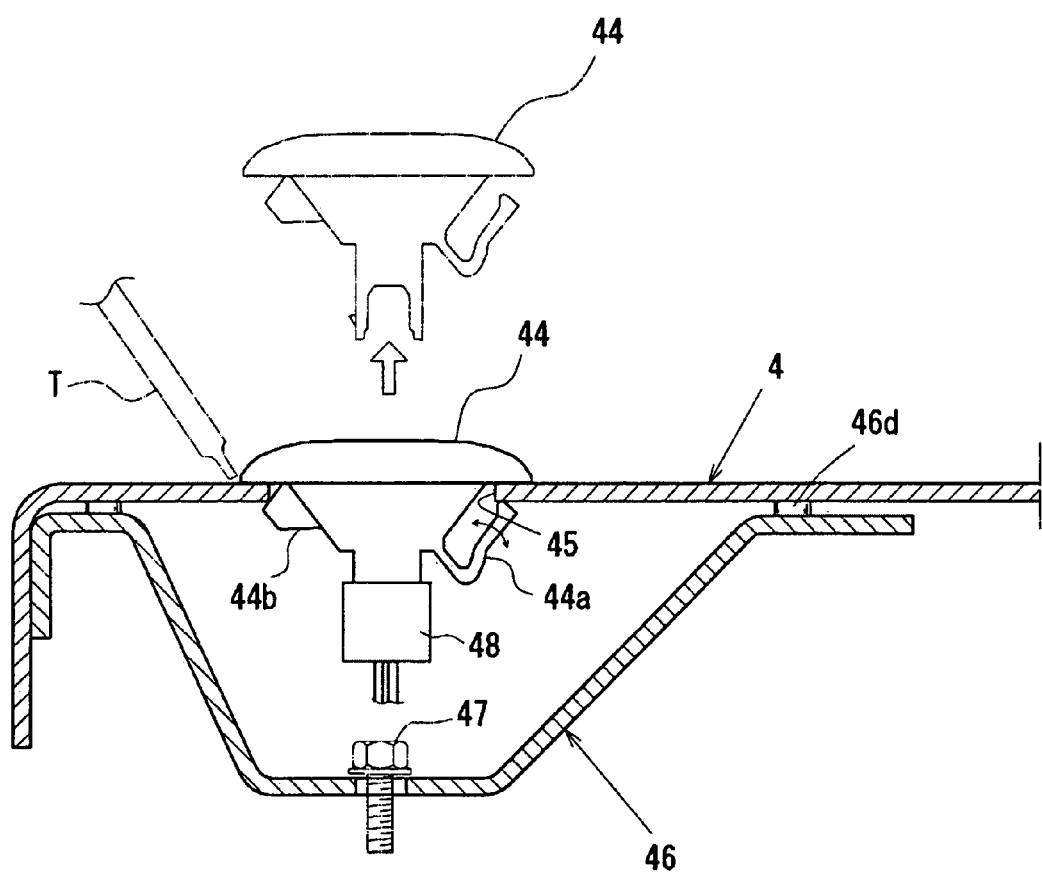
FIG. 11 is a sectional view taken along the line XI-XI in FIG. 9.

For example, in the operation of detaching the front fender 4 from the mounting sidewall segment, as shown in FIG. 11, the winker lamp 44 is detached from the front fender 4 by releasing an engagement between a peripheral edge of the opening 45 and each of a pawl 44a and a hook 44b of the winker lamp 44 insertingly attached to the opening 45 of the front fender 4, using a tool T, such as a flathead screwdriver, and then releasing a coupling between the winker lamp 44 and a connector 48. Thus, the fastening bolt 47 is exposed to the outside through the opening 45 of the front fender 4.

Then, the externally-exposed fastening bolt 47 is rotated using a tool (not shown) capable of being inserted into an internal space of the gusset through the opening 45. In this manner, the fastening of the fastening bolt 47 is released, and then the front fender is detached from the front fender 4.

As above, the fastening bolt 46 for fastening the gusset 46 is attached/detached through the use of the opening for allowing the winker lamp 44 to be insertingly attached thereto. This provides an advantage of being able to eliminate the need for forming an additional opening for use only in attaching/detaching the fastening bolt 47, and thereby effectively prevent deterioration in appearance of the front fender 4.

The functions/advantages of the vehicle body structure according to the first embodiment will be more specifically described below.

In this embodiment, the longitudinally-extending concave portion 60 is defined between the upper edge 4a of the front fender 4 and the combination of the lower edge of the front pillar 52 and the lower edge of the lateral end of the hood 2, and a plurality of components including the headlamp lens 10 and the sub-window plate 30 are received in the concave portion 60 to form the belt-line surface module which continuously covers the concave portion 60 to define a transparent or semi-transparent external surface on the body sidewall. This makes it possible to effectively utilize the sidewall surface (exterior surface of the body sidewall) located at the rear of the headlamp lens 10 so as to desirably enhance a function of the sidewall surface as a whole.

Specifically, in the first embodiment, the plurality of components including the headlamp lens 10 and the sub-window plate 30 are attached to the mounting sidewall segment in such a manner as to be aligned with each other in the longitudinal direction to form the belt-line surface module F defining a transparent or semitransparent continuous exterior surface on the body sidewall. This makes it possible to provide a coherent, distinctive appearance to the body sidewall so as to give an attractive, visually excellent function to the vehicle body to effectively achieve enhanced aesthetic advantage.

The belt-line surface module F can form a boarder range of transparent or semitransparent exterior surface region to increase a light reflectance of the body sidewall so as to effectively provide enhanced visual recognition of the body sidewall from the outside. Thus, for example, at a blind intersection, the body sidewall allows a driver entering the intersection from a lateral direction of a vehicle having the body sidewall to readily recognize the presence of the vehicle, so as to prevent the occurrence of an impact accident to effectively enhance the safety of vehicle driving.

The concave portion 60 defined between the front fender 4 and the hood 2 allows the plurality of components including the headlamp lens 10 and the sub-window plate 30 to be received therein without the need for setting the upper edge 4a of the front fender 4 at a height position of the hood 2. Thus, in a process of forming the front fender 4, a curved portion, such as a wheel arch, can be readily formed through press forming.

In addition, when it is necessary to form the front fender 4 to have a large protrude in the lateral direction due to the need for receiving a relatively wide tire in a wheel housing, the above advantage of facilitating the formation of a wheel arch in the front fender 4 allows the front fender 4 to be flexibly formed according to the level of required protrusion.

In the vehicle body structure according to the first embodiment, a lateral length of the hood 2 can be relatively largely reduced while maintaining a distance between the right and left front fenders 4, 4. Thus, as compared with a hood having the same lateral length as the distance between the front fenders, a rearwardly projected area of the vehicle can be reduced to achieve enhanced aerodynamic performance of the vehicle body.

In the vehicle body structure according to the first embodiment, plural type of vehicles each having a different height position of the hood 2 can be produced using a common front fender 4. Specifically, the belt-line surface module F comprising the headlamp lens and the sub-window plate is disposed between the front fender 4 and the hood 2. Thus, in a design for plural types of vehicles each having a different height position of the hood 2, the difference in height position of the hood 2 can be compensated by changing respective shapes of the plurality of components including the headlamp lens 10 and the sub-window plate 30. This makes it possible to use a common front fender 4 for plural type of vehicles each having a different height position of the hood 2 so as to advantageously reduce a production cost of the vehicle body.

As in the first embodiment, the longitudinally-extending belt-line surface module F may be formed using the headlamp lens 10, the sub-window plate 30, and the garnish 20 having a transparent or semitransparent outer surface layer, in such a manner that the garnish 20 is disposed between the headlamp lens 10 and the sub-window plate 30 each received in the concaved portion 60. In this case, the belt-line surface module F can be advantageously formed without difficulties even when the hood 2 has a relatively large longitudinal length.

Specifically, for example, in a design process for a vehicle having a hood 2 with a relatively large longitudinal length, if only the headlamp lens 10 and the sub-window plate 30 are used for forming the belt-line surface module F, the increase in longitudinal length has to be compensated by relatively largely increasing each longitudinal length of the headlamp lens 10 and the sub-window plate 30. This is likely to cause difficulty in forming the required components. In contrast, the belt-line surface module F consisting of the headlamp lens 10, the sub-window plate 30 and the garnish 20 disposed therebetween, as in the first embodiment, can be reliably formed without the occurrence of such an undesirable situation.

Particularly, as in the first embodiment, respective height dimensions t1, t2, t3 of the components (10, 20, 30) forming the belt-line surface module F may be increased in this order to form the belt-line surface module F having a height dimension which gradually increases in the rearward direction. This allows the belt-line surface module F to have a streamline-shaped coherent appearance so as to effectively provide enhanced aesthetic advantage to an exterior surface of the body sidewall.

As in the first embodiment, the side door window glass 50 of the side door 5 may be disposed at the rear of and in adjacent relation to the sub-window plate 30 in such a manner that respective outer surfaces of the side door window glass 50 and the belt-line surface module F including the sub-window plate 30 are continuous with each other. Thus, the body sidewall can have a broader range of transparent or semi-transparent exterior surface region which extends from the headlamp lens 10 to the side door window glass 50. This provides an advantage of allowing the body sidewall to have more attractive, distinctive aesthetic appearance, and to be more reliably visually recognized from the outside so as to more effectively enhance the safety of vehicle driving.

In the first embodiment, the front pillar 52 is disposed to extend frontwardly and obliquely downwardly with an inclination $\alpha 2$, and the hood 2 is disposed to extend frontwardly and obliquely downwardly with an inclination angle less than that of the front pillar 52. Further, the upper fender 51 serving as an intermediate member is disposed between a rear edge of the lateral end 2a of the hood 2 and a front edge of the front pillar 52 to smoothly connect therebetween. The upper fender 51 is formed to be curved in a downwardly concaved shape in side view. Thus, a front edge of the sub-window plate 30 to be received in the concave portion 60 in a region below the upper fender 51 can be formed to have a larger height dimension so as to effectively increase a lateral visual range through the sub-window plate 30.

For example, as compared with a case of forming the upper fender 51 to extend linearly with the same inclination angle $\alpha 2$ as that of the front pillar 52, the front fender 51 formed in the downwardly concaved shape provides an advantage of being able to set a height dimension of a front edge of the sub-window plate 30 at a larger value so as to effectively increase a lateral visual range through the sub-window plate 30.

In place of the above structure where the upper fender 51 serving as an intermediate member is disposed between the front pillar 52 and the hood 2, the front pillar 52 and the hood 2 may be connected together by extending the front pillar 52 downwardly, or extending the lateral end 2a of the hood 2 rearwardly.

In the first embodiment, the flange 51c of the upper fender 51 is formed to extend vertically downwardly from the top portion of the upper fender 51, and fastened to the mounting bracket 53 disposed between the front pillar 52 and the hood 2 by the fastening bolt 51d extending in the lateral direction to allow the upper fender 51 to be fixed between the front pillar 52 and the hood 2. Thus, as shown in FIG. 8, a supporting position of the front windshield 6 can be advantageously shifted in the laterally outwardly to increase an effective area of front windshield 6 so as to effectively increase a frontward visual range through the front windshield 6

Different from a fastening structure where the upper fender 51 is fastened directly to of the drawn portion 61b of the front pillar 52, the above fastening structure where the upper fender 51 is fastened to the drawn portion 61b through the mounting bracket 53 fixed onto the upper surface 61b1 of the drawn portion 61b to extend upwardly allows the upper fender 51 to be fastened to the drawn portion 61b without the need for forming a bolt-insertion hole or the like in the drawn portion 61b. This provides an advantage of being able to effectively avoid deterioration in stiffness of the front pillar 52 due to the presence of the bolt-insertion hole or the like.

In the first embodiment, the gusset 46 is fixed onto the inner surface of the front fender 4, and formed to protrude toward the door hinge pillar 70 so as to be fastened to the door hinge pillar 70, and the front fender 4 is formed with the opening 45 at a predetermined position overlapping the gusset 46 in side view to allow an operator to perform an operation of fastening the gusset 46 to the door hinge pillar 70. This provides an advantage of being able to firmly attach the front fender 5 to the mounting sidewall segment without looseness or wobbling, and readily attach/detach the fastening bolt 47 through the opening 45 so as to facilitate an operation of attaching/detaching the front fender 4.

Particularly, as in the first embodiment, when the winker lamp 44 is insertingly attached to the opening 45 of the front fender 4 in a detachable manner, the opening 45 is advantageously covered by the winker lamp 44 to adequately maintain an appearance of the front fender 4. In addition, the opening 45 for the operation of attaching/detaching the front fender 4 is additionally used as a mounting location for the winker lamp 44. Thus, differently from a case of forming a plurality of openings in the front fenders 4 on a purpose-by-purpose basis, the above structure has an advantageous of being able to effectively prevent an increase in production cost of the front fender 4 while adequately maintaining an appearance thereof.

Instead of the winker lamp 44, any other suitable lighting device, such as a foot light for illuminating feet of a passengers getting on/off a vehicle through a side door 5, may be insertingly attached to the opening 45.

Figure 12:
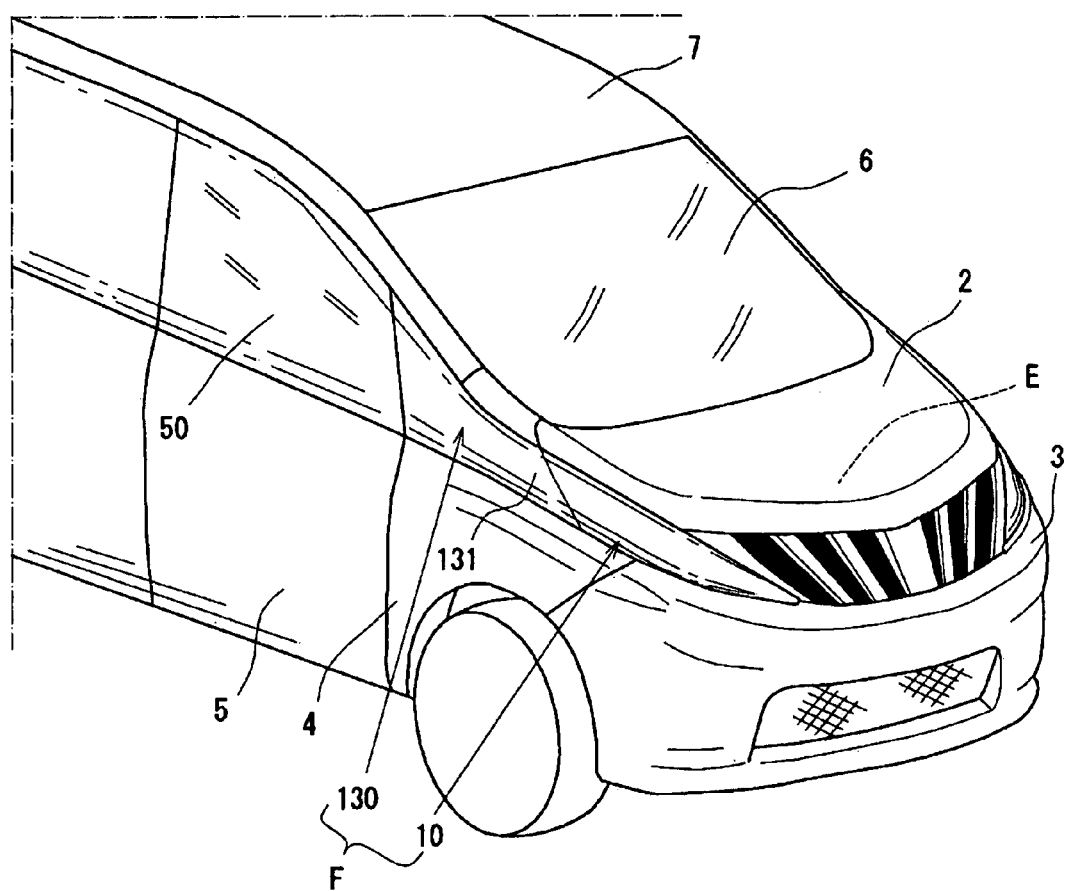
FIG. 12 is a general perspective view showing a sidewall of a vehicle body which employs a vehicle body structure according to a second embodiment of the present invention.
Figure 13:
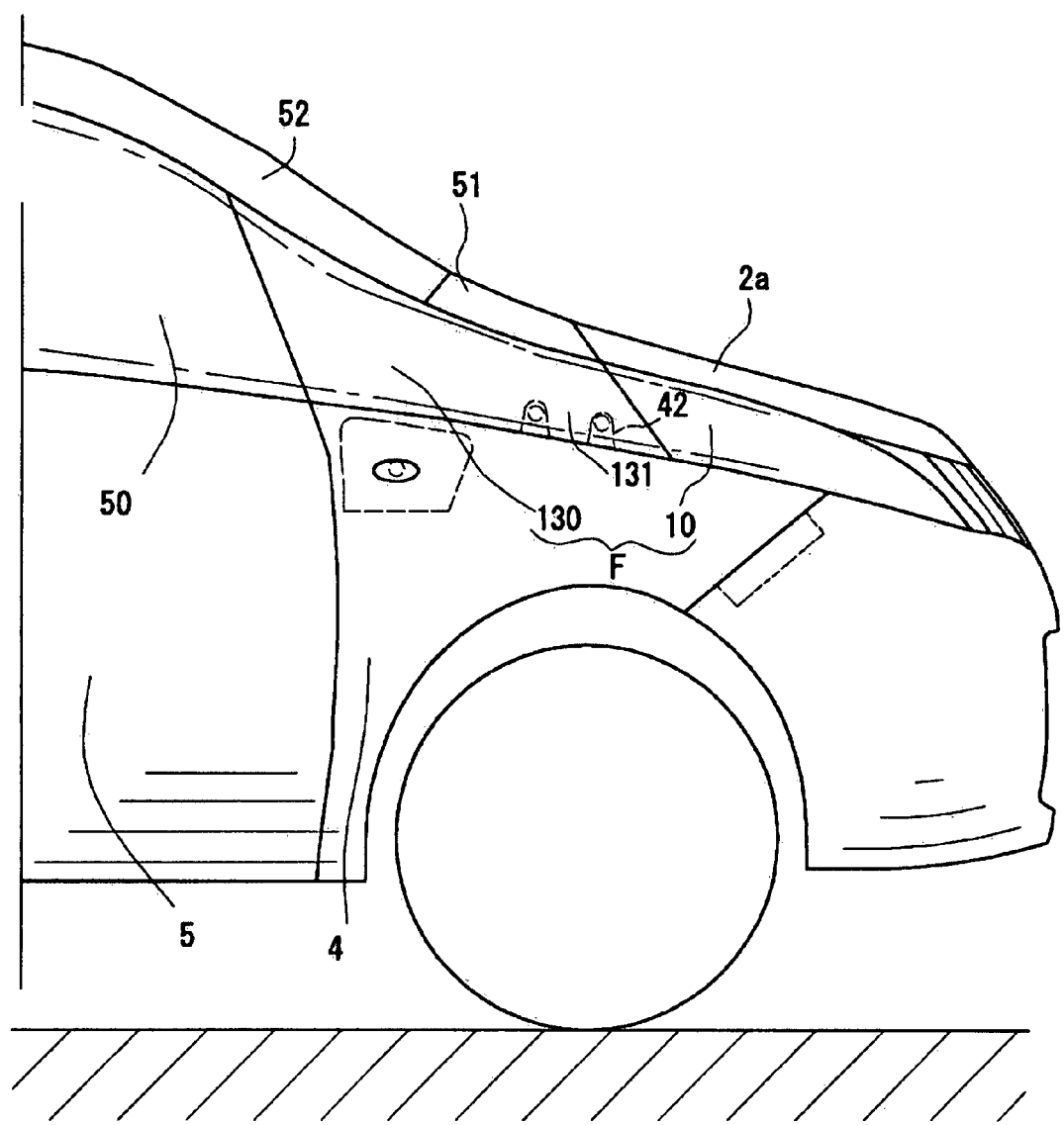
FIG. 13 is a side view of the sidewall in FIG. 10.
Figure 14:
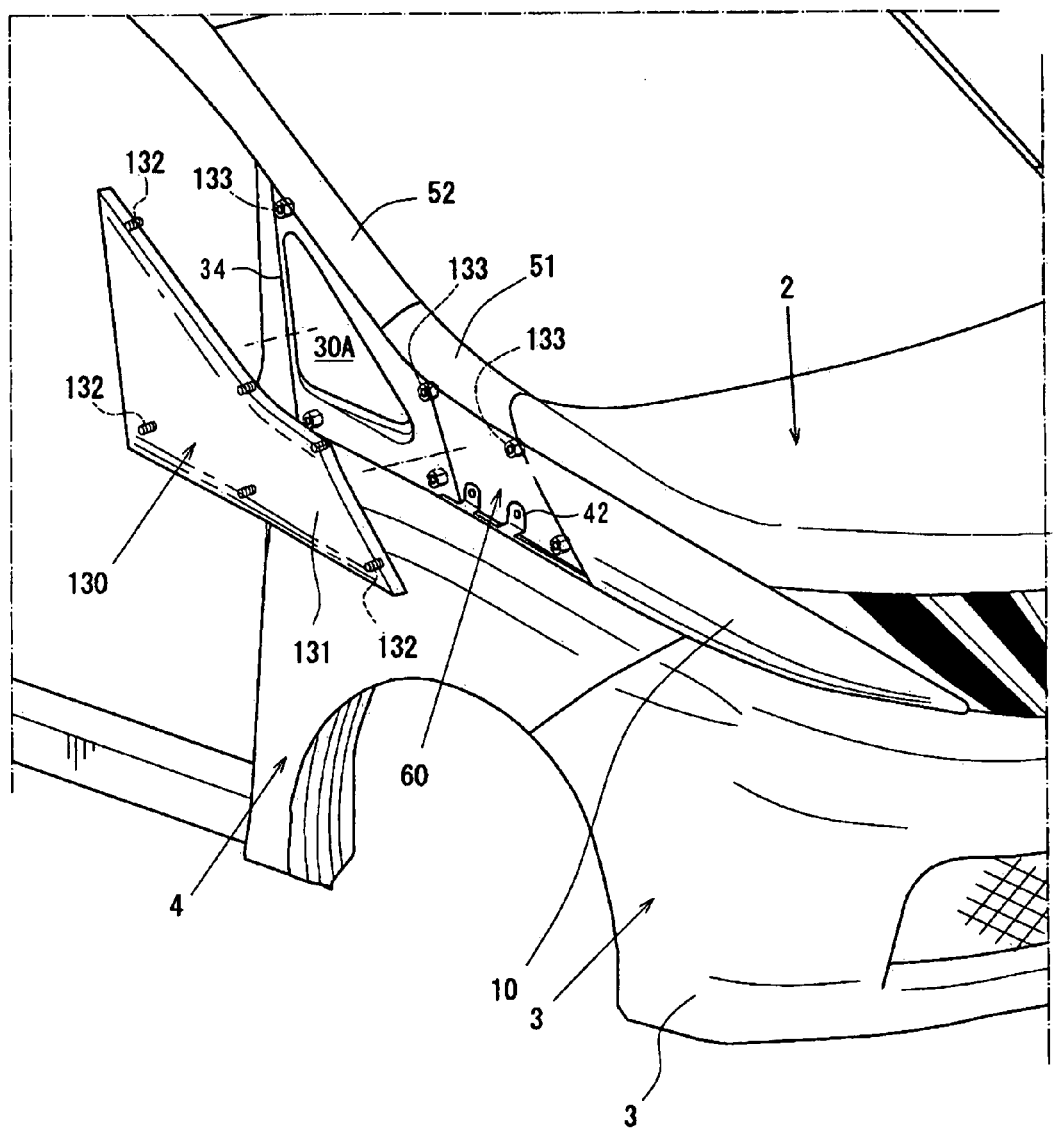
FIG. 14 is an exploded perspective view showing the sidewall in FIG. 10 in a state after a sub-window plate is detached therefrom.

With reference to FIGS. 12 to 14, a vehicle body structure according to a second embodiment of the present invention will be described below. FIG. 12 is a general perspective view which corresponds to FIG. 1 for the first embodiment, and FIG. 13 is a side view which corresponds to FIG. 2 for the first embodiment. FIG. 14 is an exploded perspective view which corresponds to FIG. 3 for the first embodiment.

In the second embodiment, a sub-window plate 130 has a first portion equivalent to the sub-window plate 30 in the first embodiment, and a second portion formed as an extension portion 131 which extends frontwardly from a front edge of the first portion up to a rear edge of a head lamp lens 10. That is, in the vehicle body structure according to the second embodiment, the garnish 20 in the first embodiment is not interposed between the headlamp lens 10 and the sub-window plate 130, and a belt-line surface module F is formed on a body sidewall only using the headlamp lens 10 and the sub-window plate 130. The remaining structure is the same as that in the first embodiment. In FIGS. 12 to 14, the same element or component as that in the first embodiment is defined by the same reference numeral or code, and its description will be omitted.

As shown in FIGS. 13 and 14, a front fender 4 has a fastening flange 42 formed at an upper edge thereof. The fastening flange 42 is formed with a bolt-insertion hole, and a fastening bolt (not shown) is inserted through the bolt-insertion hole to fix the front fender 4 to a mounting sidewall segment. The extension portion 131 of the sub-window plate 130 is formed and arranged to cover the fastening flange 42 and the fastening bolt from outside.

As shown in FIG. 14, differently from the adhesive-based fixing means employed in the first embodiment, the sub-window plate 130 is detachably fixed to the mounting sidewall segment by fixing means using a stud bolt or the like. Thus, an operation of detaching the front fender 4 can be performed after detaching the sub-window plate 130.

Specifically, the sub-window plate 130 is provided with a plurality (in this embodiment, six) of stud bolts 132, 132, - - - , in a back surface (i.e., laterally inward-facing or inner surface). The stud bolts 132, 132 are fastened, respectively, with a plurality (in this embodiment, six) of nuts 133, 133 provided in an associated body member of the mounting sidewall segment, so as to be detachably fixed to the body member.

As to means for fixing the sub-window plate 130, any other suitable means capable of detachably fixing the sub-window plate 130, such as an engagement clip, may be employed.

As above, in the second embodiment, the sub-window plate 130 has the first portion disposed in the region between a front pillar 52 and the front fender 4 to extend in a longitudinal direction of the vehicle body, and the second portion formed as the extension portion 131 which extends frontwardly from the front edge of the first portion to the rear of the headlamp lens. Thus, the belt-line surface module F can be formed only using the headlamp lens 10 and the sub-window plate 130, without employing the garnish 20 which is used in the first embodiment, so as to reduce the number of components and an assembling process time.

The belt-line surface module F formed only using the headlamp lens 10 and the sub-window plate 130 makes it possible to provide enhanced coherent appearance to the belt-line surface module F, and effectively achieve enhanced aesthetic advantage of an exterior surface of the body sidewall.

Further, the fastening flange 42 at the upper edge of the front fender 4, and the associated fastening bolt, are fully covered by the extension portion 131 of the sub-window plate 130, instead of the garnish 20. This provide an advantage of being able to cover over fastening elements, such as the fastening flange 42, by use of the sub-window plate 130, i.e., an existing component, and effectively enhance an aesthetic advantage of an external surface of the body sidewall in a simple manner.

The remaining functions/advantages are the same as those in the first embodiment.

Figure 15:
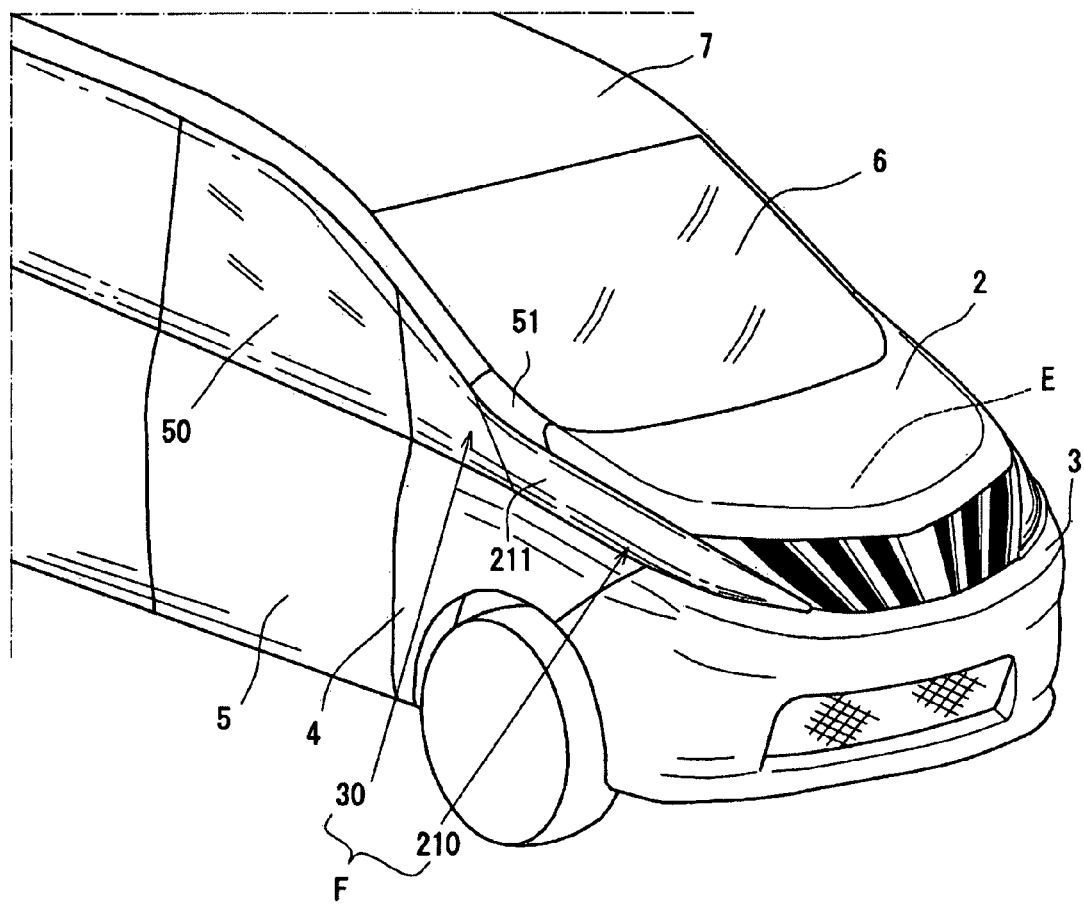
FIG. 15 is a general perspective view showing a sidewall of a vehicle body which employs a vehicle body structure according to a third embodiment of the present invention.
Figure 16:
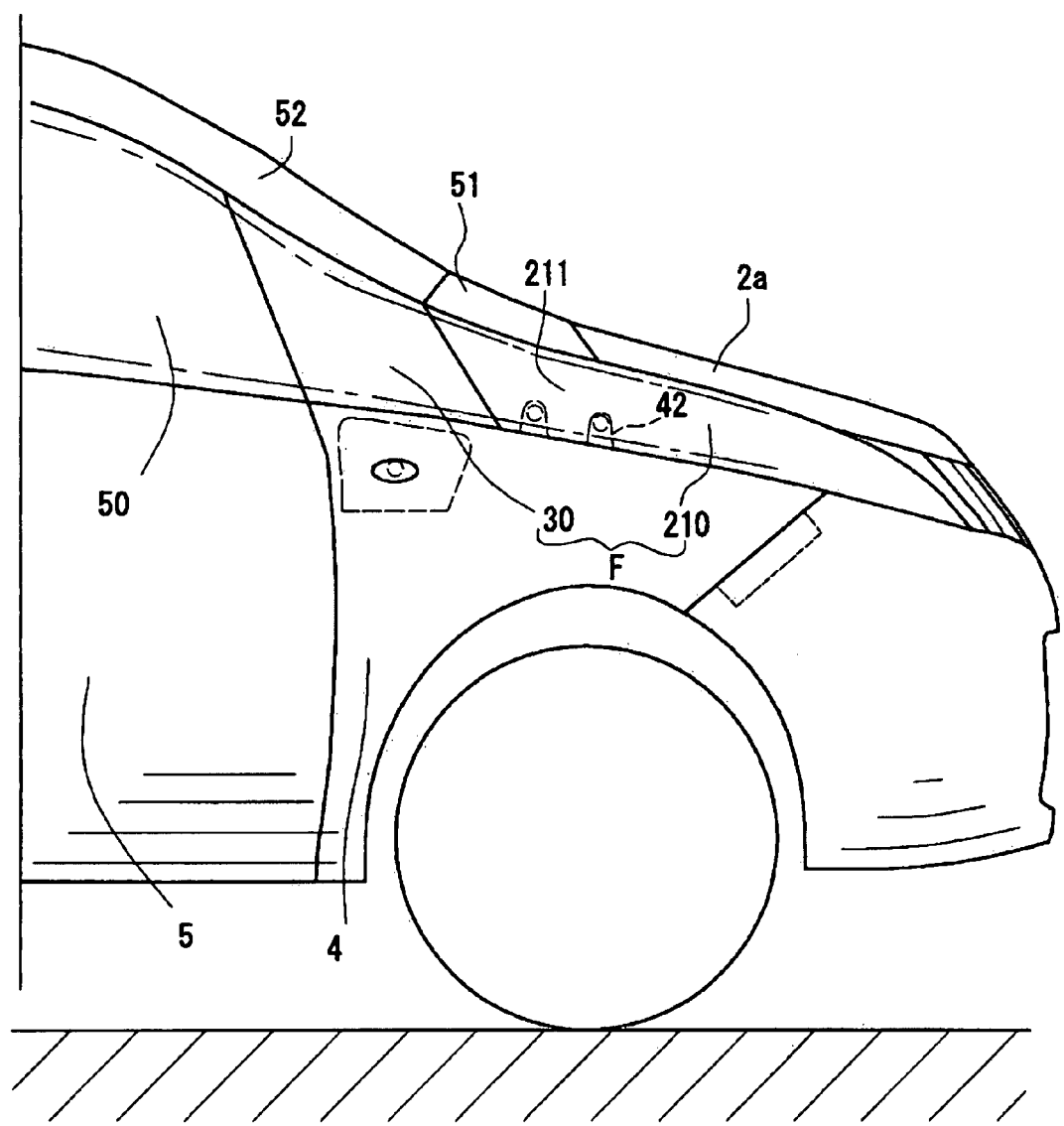
FIG. 16 is a side view of the sidewall in FIG. 15.

With reference to FIGS. 15 and 16, a vehicle body structure according to a third embodiment of the present invention will be described below. FIG. 15 is a general perspective view which corresponds to FIG. 1 for the first embodiment, and FIG. 16 is a side view which corresponds to FIG. 2 for the first embodiment.

In the third embodiment, a headlamp lens 210 has a first portion equivalent to the headlamp lens 10 in the first embodiment, and a second portion formed as an extension portion 211 which extends rearwardly from a rear edge of the first portion up to a front edge of a sub-window plate 30. That is, in the vehicle body structure according to the third embodiment, the garnish 20 in the first embodiment is not interposed between the headlamp lens 210 and the sub-window plate 30, and a belt-line surface module F is formed on a body sidewall only using the headlamp lens 210 and the sub-window plate 30. The remaining structure is the same as that in the first embodiment. In FIGS. 15 and 16, the same element or component as that in the first embodiment is defined by the same reference numeral or code, and its description will be omitted.

As shown in FIG. 16, the extension portion 211 of the headlamp lens 210 is formed and arranged to cover, from outside, a fastening flange 42 at an upper edge of a front fender 4 and a fastening bolt associated with the fastening flange 42, so as to serve as a covering means to prevent fastening elements, such as the fastening flange 42, from being exposed to the outside.

As above, in the third embodiment, the headlamp lens 210 is formed with the extension portion 211 extending rearwardly from the rear edge of the first portion up to the front edge of the sub-window plate 30. Thus, the belt-line surface module F can be formed only using the headlamp lens 210 and the sub-window plate 30, without employing the garnish 20 which is used in the first embodiment, so as to reduce the number of components and an assembling process time.

The belt-line surface module F formed only using the headlamp lens 210 and the sub-window plate 30 makes it possible to provide enhanced coherent appearance to the belt-line surface module F, and effectively achieve enhanced aesthetic advantage of an exterior surface of the body sidewall.

Further, the fastening flange 42 at the upper edge of the front fender 4, and the associated fastening bolt, are fully covered by the extension portion 211 of the headlamp lens 210 (with a rear end of a headlamp housing (not shown)), instead of the garnish 20. This provide an advantage of being able to cover over the fastening elements, such as the fastening flange 42, by use of the headlamp lens 210, i.e., an existing component, and effectively enhance an aesthetic advantage of an external surface of the body sidewall in a simple manner.

The remaining functions/advantages are the same as those in the first embodiment.

Figure 17:
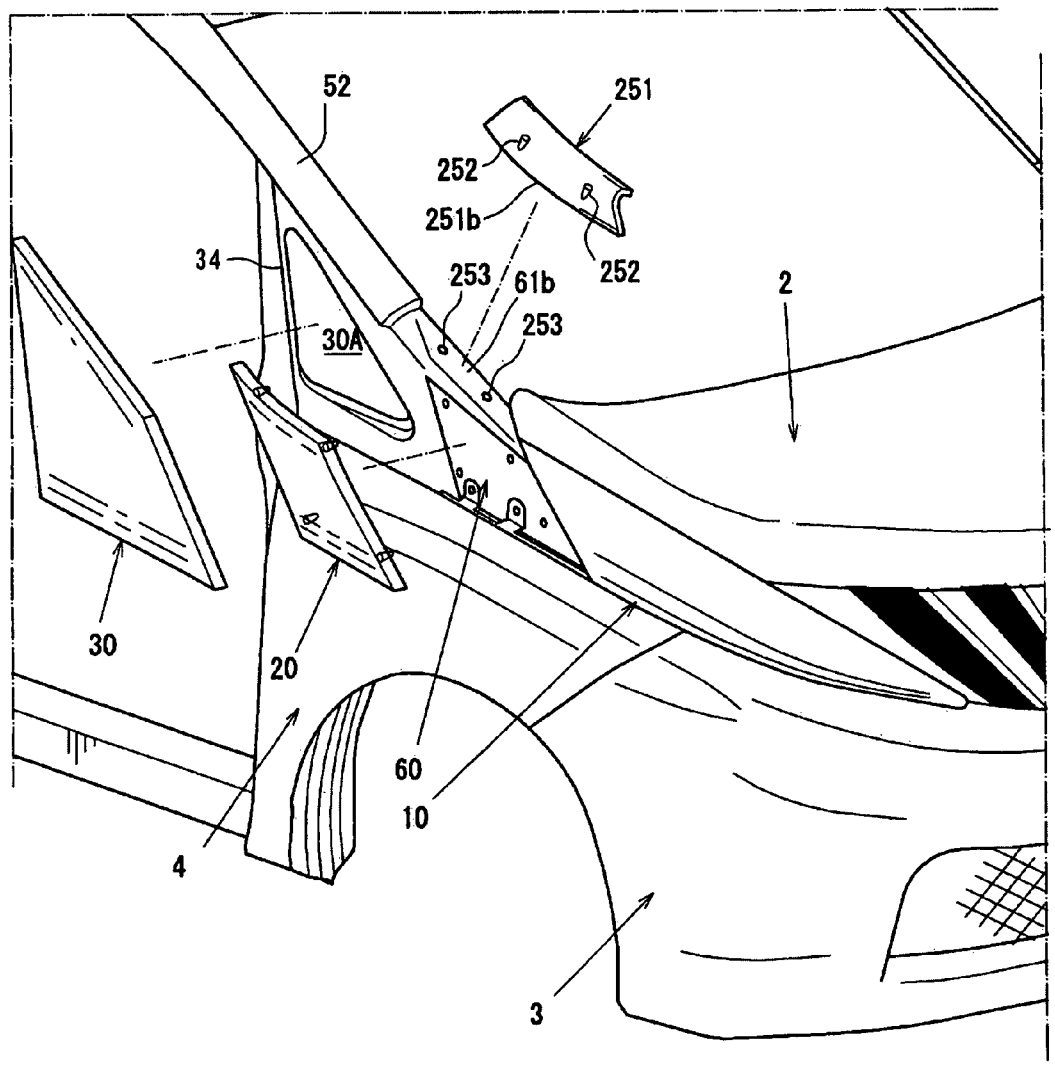
FIG. 17 is an exploded perspective view showing a sidewall of a vehicle body which employs a vehicle body structure according to a fourth embodiment of the present invention.
Figure 18:
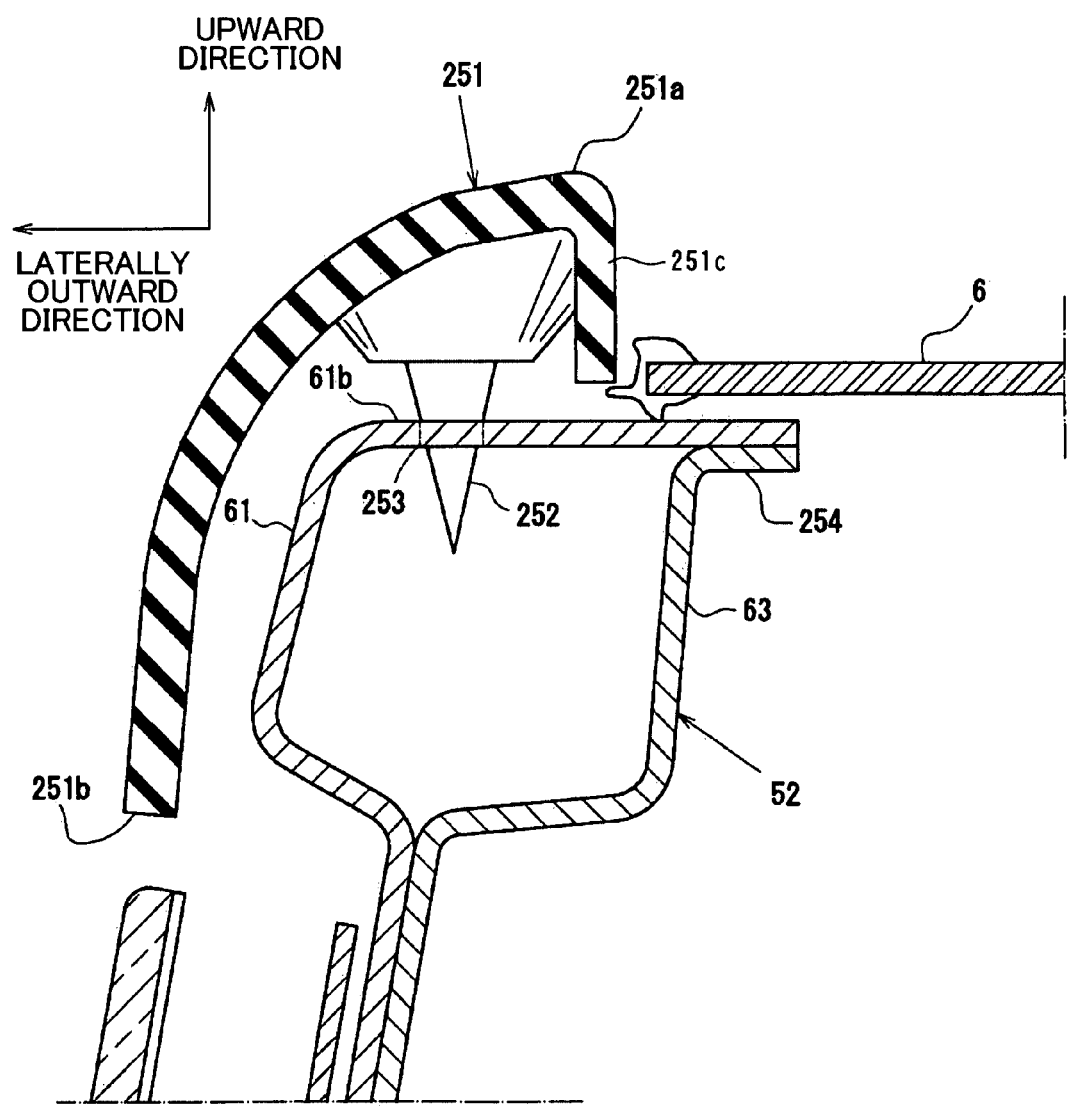
FIG. 18 is sectional view of the sidewall in the fourth embodiment, which corresponds to FIG. 8.

With reference to FIGS. 17 and 18, a vehicle body structure according to a fourth embodiment of the present invention will be described below. FIG. 17 is a general perspective view which corresponds to FIG. 3 for the first embodiment, and FIG. 18 is a sectional view which corresponds to FIG. 8 for the first embodiment.

In the fourth embodiment, a resin pillar garnish 251 made of a transparent or semitransparent, easy-moldable resin material is provided as an intermediate member disposed between a front pillar 52 and an engine-compartment hood (hood) 251. The remaining structure is the same as that in the first embodiment. In FIGS. 17 and 18, the same element or component as that in the first embodiment is defined by the same reference numeral or code, and its description will be omitted.

As shown in FIG. 17, the pillar garnish 251 has a plurality (in this embodiment, two) of clip legs 252 which are formed on a back surface thereof, and the front pillar 52 has a drawn portion 61b formed with a plurality (in this embodiment, two) of engagement holes 253 each engageable with a corresponding with the clip legs 252. Thus, the pillar garnish 251 is detachably fixed between the front pillar 52 and the hood 2 by means of an engagement between the clip legs 252 and the engagement holes 253.

Means for fixing the pillar garnish 251 is not limited to the above clip-based means.

As above, in the fourth embodiment, the intermediate member disposed between the front pillar 52 and the hood 2 comprises the resin pillar garnish 251. Thus, even when it is necessary to form the pillar garnish 251 in such a manner as to be curved in a downwardly concave shape which smoothly connects between the front pillar 52 and the hood 2, the pillar garnish 251 can be formed through a simplified molding process.

Specifically, as shown in FIG. 18, in the pillar garnish 251 formed in a downwardly concave shape, a distance between a flange 254 of the front pillar 52 extending approximately linearly along a lateral end of a front windshield 6, and a top portion 251a of the pillar garnish 251 formed in a downwardly concave shape in side view (see FIG. 17) gradually increases toward a front end of the front pillar 52. Correspondingly, it is necessary for a bent portion 251c extending vertically downward from the top portion 251a of the pillar garnish 251 to have to a height dimension which gradually increase toward a front end of the front pillar 52. In this case, if the pillar garnish 251 is made of a metal material, it is required to form such a shape using a relatively advanced metal working technique, such as "deep drawing" to inevitably cause a problem about a relatively high forming cost. In contrast, the pillar garnish 251 made of a resin material as in the fourth embodiment has an advantage of being able to be readily formed in a relatively complicated shape while effectively suppressing an increase in forming cost thereof.

The remaining functions/advantages are the same as those in the first embodiment.

Figure 19:
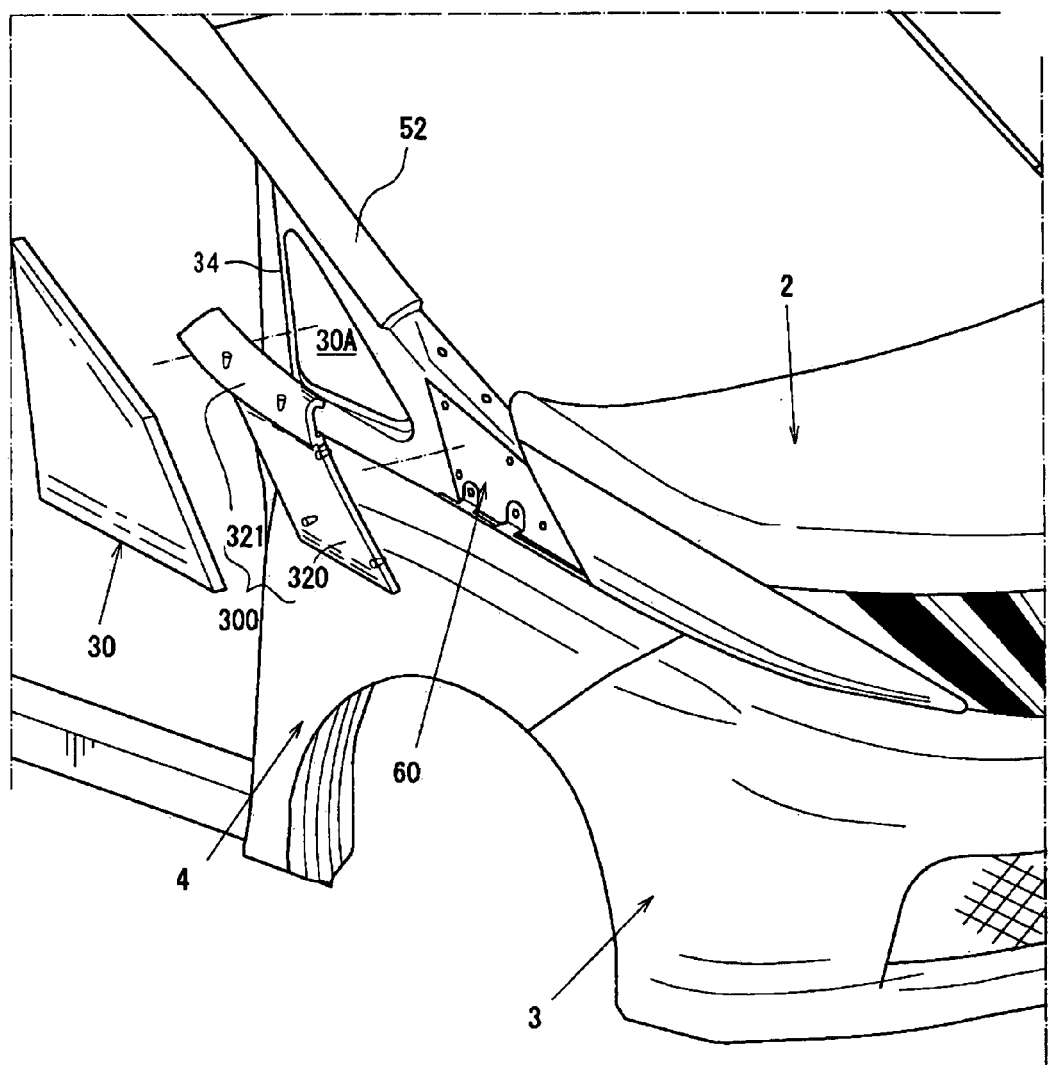
FIG. 19 is an exploded perspective view showing a sidewall of a vehicle body which employs a vehicle body structure according to a fifth embodiment of the present invention.
Figure 20:
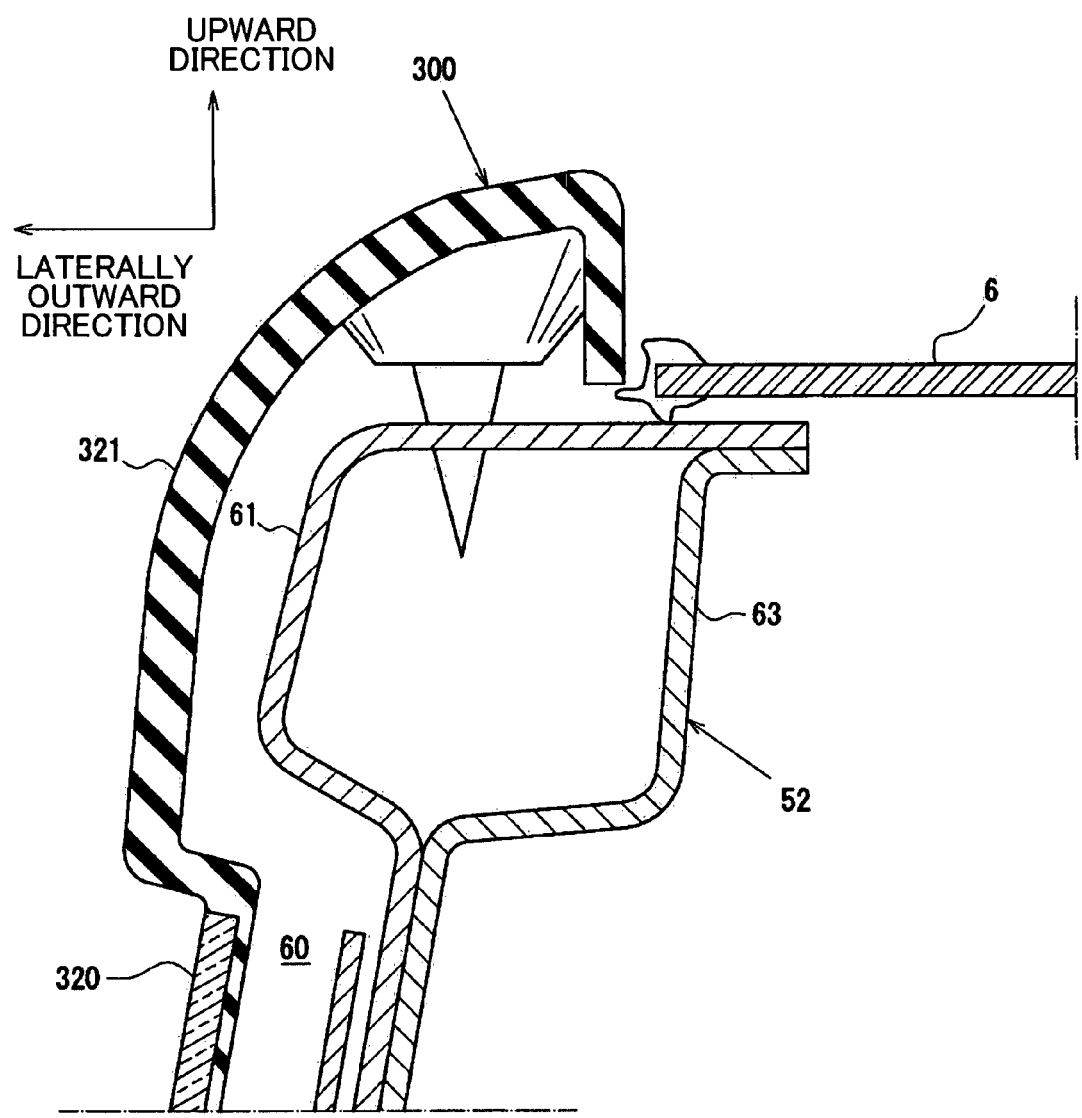
FIG. 20 is sectional view of the sidewall in the fifth embodiment, which corresponds to FIG. 8.

With reference to FIGS. 19 and 20, a vehicle body structure according to a fifth embodiment of the present invention will be described below. FIG. 19 is a general perspective view which corresponds to FIG. 3 for the first embodiment, and FIG. 20 is a sectional view which corresponds to FIG. 8 for the first embodiment.

In the fifth embodiment, a garnish portion 320 made of a clear polymeric material and a pillar garnish portion 321, are formed as an integral component 300. That is, while a garnish 20 made of a clear polymeric material and the pillar garnish 251 are formed separately in the fourth embodiment, the garnish portion 320 pillar garnish portion 321 in the fifth embodiment are formed into a single piece through an integral molding process using a resin material. The remaining structure is the same as that in the first embodiment. In FIGS. 19 and 20, the same element or component as that in the first embodiment is defined by the same reference numeral or code, and its description will be omitted.

As shown in FIG. 19, the integral component 300 comprising the garnish portion 320 and the pillar garnish portion 321 is detachably fixed to a mounting sidewall segment by clip-based fixing means as with the fourth embodiment.

As above, in the fifth embodiment, the garnish portion 320 pillar garnish portion 321 are formed as the integral component 300. Thus, the structure as illustrated in FIG. 17 is likely to occurrence of a gap between the two member, the structure according to the fifth embodiment can avoid such an undesirable situation to effectively prevent foreign matters, such as rain water, from getting into a concave portion 60 for receiving therein the integral component 300, so as to provide enhanced waterproofing performance.

The integral component 300 comprising the pillar garnish portion 321 and the garnish portion 320 can facilitate reductions in the number of components and an assembly process time. The remaining functions/advantages are the same as those in the first embodiment.

In the fifth embodiment, the pillar garnish 321 serving as the intermediate member between the front pillar 52 and the hood 2, and the garnish 321 serving as one component of the belt-line surface module F, are formed as the integral component. Alternatively, for example, when a sub-window plate 130 has a forwardly-extending extension portion 130 as in the second embodiment illustrated in FIGS. 12 to 14 (i.e., when the garnish 320 is omitted), this sub-window plate 130 may be formed as a transparent resin member, and then the above pillar garnish portion 321 may be integrally formed with the transparent resin sub-window plate 130.

The present invention has been described based on the first to fifth preferred embodiments thereof. These specific embodiments are simply shown and described by way of an example, and various modifications and changes may be made therein without departing from the spirit and scope of the invention. Further, while the vehicle body structure of the present invention has been described based on one example where the present invention is applied to a minivan-type vehicle, the present invention may be applied to any other suitable type of vehicle, such as a sedan type and a wagon type.

As described in connection with the various embodiments, according to a first aspect of the present invention, there is provided a vehicle body structure which comprises a frame-shaped window mounting member disposed above a door hinge pillar to serve as a mounting seat for a transparent or semitransparent sub-window plate, a front pillar disposed above the window mounting member to extend frontwardly and obliquely downwardly along a lateral edge of a front windshield, a hood disposed in front of a location of the front windshield, and a front fender disposed below the window mounting member to define a part of an exterior surface of a sidewall of a vehicle body. The vehicle body structure is characterized in that the front fender has an upper edge which extends in a longitudinal direction of the vehicle body at a height position spaced apart downwardly by a predetermined distance from a lower edge of a lateral end of the hood and a lower edge of the front pillar, so that a longitudinally-extending concave portion is defined between the upper edge of the front fender and the respective edges of the hood and the front pillar. The concave portion has at least a frontward region partly receiving therein a headlamp lens and a rearward region receiving therein the sub-window plate at the rear of the headlamp lens, whereby a plurality of components including the headlamp lens and the sub-window plate are received in the concave portion to form a belt-line surface module which continuously covers the concave portion to define a transparent or semi-transparent exterior surface on the sidewall of the vehicle body.

In the vehicle body structure of the present invention, the longitudinally-extending concave portion is defined between the upper edge of the front fender and the combination of the lower edge of the front pillar and the lower edge of the lateral end of the hood, and a plurality of components including at least the headlamp lens and the sub-window plate are received in the concave portion to form the belt-line surface module which continuously covers the concave portion to define a transparent or semi-transparent external surface on the body sidewall. This makes it possible to effectively utilize the sidewall surface (exterior surface of the body sidewall) located at the rear of the headlamp lens 10 so as to desirably enhance a function of the sidewall surface as a whole.

Specifically, in the vehicle body structure of the present invention, the plurality of components including the headlamp lens and the sub-window plate are arranged to be aligned with each other in the longitudinal direction so as to form the belt-line surface module F defining a transparent or semitransparent continuous exterior surface on the body sidewall. This makes it possible to provide a coherent, distinctive appearance to the body sidewall so as to give an attractive, visually excellent function to the vehicle body to effectively achieve enhanced aesthetic advantage.

Preferably, in the vehicle body structure of the present invention, the plurality of components consist of the headlamp lens, the sub-window plate, and a garnish having a transparent or semi-transparent outer surface layer, wherein the headlamp lens and the sub-window plate are disposed in longitudinally spaced-apart relation to each other within the concave portion, and the garnish is disposed between the headlamp lens and the sub-window plate, so as to form the belt-line surface module extending in the longitudinal direction.

The above structure provided with the garnish disposed between the headlamp lens and the sub-window plate has an advantage of being able to readily form the belt-line surface module an even in a vehicle having a hood having a relatively large longitudinal length.

Preferably, when the vehicle body structure includes a side door having a front end pivotally attached to the door hinge pillar, the side door includes a side door window glass disposed at the rear of and in adjacent relation to the sub-window plate in such a manner that respective outer surfaces of the side door window glass and the belt-line surface module including the sub-window plate are continuous with each other.

The above arrangement where the respective outer surfaces of the side door window glass and the belt-line surface module including the sub-window plate are continuous with each other, the body sidewall can have a broader range of transparent or semi-transparent exterior surface region which extends from the headlamp lens to the side door window glass. This provides an advantage of allowing the body sidewall to have more attractive, distinctive aesthetic appearance.

Preferably, when the hood is disposed to extend in the longitudinal direction with an inclination angle less than that of the frontwardly and obliquely downwardly-extending front pillar, the vehicle body structure includes an intermediate member which is formed to be curved in a downwardly concave shape in side view, and disposed between a rear edge of the lateral end of the hood and a front edge of the front pillar, and the belt-line surface module has an upper edge partially formed in a downwardly concave shape in conformity to the shape of the intermediate member.

In the above structure, a front edge of the sub-window plate to be received in the concave portion can be formed to have a larger height dimension so as to effectively increase a lateral visual range through the sub-window plate 30.

Preferably, in this structure, the intermediate member has a flange which is formed to extend vertically downwardly from a top portion thereof, and fastened to a mounting bracket disposed between the front pillar and the hood, by a fastening member extending in a lateral direction of the vehicle body, to allow the intermediate member to be fixed between the front pillar and the hood.

This structure provides an advantage of being able to shift a supporting position of the front windshield in the laterally outwardly so as to increase an effective area of front windshield to effectively increase a frontward visual range through the front windshield.

Preferably, the intermediate member is integrally formed with at least one of the plurality of components forming the belt-line surface module.

This makes it possible to avoid an undesirable situation where a gap is formed between the intermediate member and the belt-line surface module, to effectively prevent foreign matters, such as rain water, from getting into a concave portion for receiving therein the integral component, so as to provide enhanced waterproofing performance to the body sidewall.

Preferably, the vehicle body structure of the present invention includes a gusset which is fixed onto an inner surface of the front fender, and formed to protrude toward the door hinge pillar so as to be fastened to the door hinge pillar, wherein the front fender has an opening formed at a predetermined position overlapping the gusset in side view to allow an operator to perform an operation of fastening the gusset to the door hinge pillar.

This structure has an advantage of being able to firmly attach the front fender to the vehicle body without looseness or wobbling, and facilitating an operation of attaching/detaching the front fender.

Preferably, the opening of the front fender is formed to allow a lighting device to be insertingly attached thereto in a detachable manner.

This structure has an advantage of being able to cover the opening by the winker lamp so as to adequately maintain an appearance of the front fender.

According to a second aspect of the present invention, there is provided a vehicle body structure which comprises a frame-shaped window mounting member disposed above a door hinge pillar to serve as a mounting seat for a transparent or semitransparent sub-window plate, a front pillar disposed above the window mounting member to extend frontwardly and obliquely downwardly along a lateral edge of a front windshield, a hood disposed in front of a location of the front windshield, and a front fender disposed below the window mounting member to define a part of an exterior surface of a sidewall of a vehicle body. The vehicle body structure is characterized in that the sub-window plate has a first portion disposed in a region vertically sandwiched between a lower edge of the front pillar and an upper edge of the front fender, to extend in a longitudinal direction of the vehicle body, and a second portion formed as an extension portion which extends frontwardly from a front edge of the first portion up to a rear edge of a headlamp lens disposed on the sidewall of the vehicle.

In this vehicle body structure of the present invention, the transparent or semitransparent headlamp lens and sub-window plate are arranged to be aligned with each other in the longitudinal direction to advantageously provide a coherent, distinctive appearance to the body sidewall According to a third aspect of the present invention, there is provided a vehicle body structure which comprises a frame-shaped window mounting member disposed above a door hinge pillar to serve as a mounting seat for a transparent or semitransparent sub-window plate, a front pillar disposed above the window mounting member to extend frontwardly and obliquely downwardly along a lateral edge of a front windshield, a hood disposed in front of a location of the front windshield, and a front fender disposed below the window mounting member to define a part of an exterior surface of a sidewall of a vehicle body. The vehicle body structure is characterized by including a garnish having a transparent or semi-transparent outer surface layer. The garnish is disposed in a region surrounded by a rear edge of a headlamp lens disposed on the sidewall, a front edge of the sub-window plate, a lower edge of a lateral end of the hood and an upper edge of the front fender.

In this vehicle body structure of the present invention, a longitudinally-extending transparent or semitransparent region can be formed by arranging the garnish between the headlamp lens and the sub-window plate. This provides an advantage of being able to allow the body sidewall to have a coherent, distinctive appearance.

This application is based on five Japanese Patent Application Serial Nos. 2006-131025, 2006-137577, 2006-138964, 2006-138965, and 2006-138966, filed with Japan Patent Office on May 10, 2006, May 17, 2006, May 18, 2006, May 18, 2006, and May 18, 2006, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle body structure comprising:
   a frame-shaped window mounting member disposed above a door hinge pillar to serve as a mounting seat for a sub-window plate;
   a front pillar disposed above said window mounting member to extend frontwardly and obliquely downwardly along a lateral edge of a front windshield;
   a hood disposed in front of a location of said front windshield; and
   a front fender disposed below said window mounting member to define a part of an exterior surface of a sidewall of a vehicle body,
   said vehicle body structure being characterized in that said front fender has an upper edge which extends in a longitudinal direction of said vehicle body at a height position spaced apart downwardly by a predetermined distance from a lower edge of a lateral end of said hood and a lower edge of said front pillar, so that a longitudinally-extending concave portion is defined between the upper edge of said front fender and the respective edges of said hood and said front pillar,
   wherein said concave portion has at least a frontward region partly receiving therein a headlamp lens and a rearward region receiving therein said sub-window plate at the rear of said headlamp lens, whereby a plurality of components including at least said headlamp lens and said sub-window plate are received in said concave portion to form a belt-line surface module which continuously covers said concave portion to define a transparent or semi-transparent exterior surface on the sidewall of the vehicle body.

2. The vehicle body structure according to claim 1, wherein said plurality of components consist of said headlamp lens, said sub-window plate, and a garnish having a transparent or semi-transparent outer surface layer, wherein said headlamp lens and said sub-window plate are disposed in longitudinally spaced-apart relation to each other within said concave portion, and said garnish is disposed between said headlamp lens and said sub-window plate, so as to form said belt-line surface module extending in the longitudinal direction.

3. The vehicle body structure according to claim 1, further comprising a side door which has a front end pivotally attached to said door hinge pillar, and includes a side door window glass disposed at the rear of and in adjacent relation to said sub-window plate in such a manner that respective outer surfaces of said side door window glass and said belt-line surface module including said sub-window plate are continuous with each other.

4. The vehicle body structure according to claim 1, wherein said hood is disposed to extend in the longitudinal direction with an inclination angle less than that of said frontwardly and obliquely downwardly-extending front pillar, wherein:
   said vehicle body structure includes an intermediate member which is formed to be curved in a downwardly concave shape in side view, and disposed between a rear edge of the lateral end of said hood and a front edge of said front pillar; and
   said belt-line surface module has an upper edge partially formed in a downwardly concave shape in conformity to the shape of said intermediate member.

5. The vehicle body structure according to claim 4, wherein said intermediate member has a flange which is formed to extend vertically downwardly from a top portion thereof, and fastened to a mounting bracket disposed between said front pillar and said hood, by a fastening member extending in a lateral direction of said vehicle body, to allow said intermediate member to be fixed between said front pillar and said hood.

6. The vehicle body structure according to claim 4, wherein said intermediate member is integrally formed with at least one of said plurality of components forming said belt-line surface module.

7. The vehicle body structure according to claim 1, further including a gusset which is fixed onto an inner surface of said front fender, and formed to protrude toward said door hinge pillar so as to be fastened to said door hinge pillar, wherein said front fender has an opening formed at a predetermined position overlapping said gusset in side view to allow an operator to perform an operation of fastening said gusset to said door hinge pillar.

8. The vehicle body structure according to claim 7, wherein said opening of said front fender is formed to allow a lighting device to be insertingly attached thereto in a detachable manner.

9. A vehicle body structure comprising:
   a frame-shaped window mounting member disposed above a door hinge pillar to serve as a mounting seat for a sub-window plate;

a front pillar disposed above said window mounting member to extend frontwardly and obliquely downwardly along a lateral edge of a front windshield;

a hood disposed in front of allocation of said front windshield; and a front fender disposed below said window mounting member to define a part of an exterior surface of a sidewall of a vehicle body, said vehicle body structure being characterized in that said sub-window plate has:

a first portion disposed in a region vertically sandwiched between a lower edge of said front pillar and an upper edge of said front fender, to extend in a longitudinal direction of said vehicle body; and a second portion formed as an extension portion which extends frontwardly from a front edge of said first portion up to a rear edge of a headlamp lens disposed on the sidewall of the vehicle.

10. A vehicle body structure comprising:

a frame-shaped window mounting member disposed above a door hinge pillar to serve as a mounting seat for a sub-window plate;

a front pillar disposed above said window mounting member to extend frontwardly and obliquely downwardly along a lateral edge of a front windshield;

a hood disposed in front of a location of said front windshield; and a front fender disposed below said window mounting member to define a part of an exterior surface of a sidewall of a vehicle body, said vehicle body structure being characterized by including a garnish having a transparent or semi-transparent outer surface layer, said garnish being disposed in a region surrounded by a rear edge of a headlamp lens disposed on the sidewall, a front edge of said sub-window plate, a lower edge of a lateral end of said hood and an upper edge of said front fender.

\* \* \* \* \*